(12) United States Patent
Pistikopoulos et al.

(10) Patent No.: US 7,433,743 B2
(45) Date of Patent: Oct. 7, 2008

(54) PROCESS CONTROL USING CO-ORDINATE SPACE

(75) Inventors: Efstratios Pistikopoulos, London (GB); Nikolaos A. Bozinis, London (GB); Vivek Dua, London (GB); John D. Perking, Manchester (GB); Vassilis Sakizlis, London (GB)

(73) Assignee: Imperial College Innovations, Ltd., London (GB)

( * ) Notice: Subject to any disclaimer, the term of this patent is extended or adjusted under 35 U.S.C. 154(b) by 0 days.

(21) Appl. No.: 10/479,100

(22) PCT Filed: May 27, 2002

(86) PCT No.: PCT/GB02/02456

§ 371 (c)(1), (2), (4) Date: Sep. 27, 2004

(87) PCT Pub. No.: WO02/097540

PCT Pub. Date: Dec. 5, 2002

(65) Prior Publication Data

US 2005/0107895 A1    May 19, 2005

(30) Foreign Application Priority Data

May 25, 2001 (GB) ................... 0112848.7
Nov. 6, 2001 (GB) ................... 0126652.7
May 10, 2002 (GB) ................... 0210758.9

(51) Int. Cl.
G05B 13/02 (2006.01)
G05B 11/32 (2006.01)
G05B 19/42 (2006.01)
G06F 15/00 (2006.01)
G06F 7/60 (2006.01)
G06F 17/10 (2006.01)
H03F 1/26 (2006.01)
H04B 15/00 (2006.01)

(52) U.S. Cl. .............. 700/52; 700/29; 700/32; 700/67; 700/86; 700/89; 702/189; 703/2

(58) Field of Classification Search .......... 700/28–34, 700/44, 47, 49, 51, 52, 67, 73, 74, 86, 89, 700/104; 703/2, 22, 6, 7, 9; 706/21; 702/179, 702/189

See application file for complete search history.

(56) References Cited

U.S. PATENT DOCUMENTS 4,338,672 A * 7/1982 Perzley et al. ............. 700/249

(Continued)

FOREIGN PATENT DOCUMENTS

EP    0712060    5/1996

(Continued)

OTHER PUBLICATIONS

Morari et al., "Model Predictive Control; past, present and future", (1999) Comput. Chem. Engng. 23, pp. 667-682.

(Continued)

*Primary Examiner*—Crystal Barnes Bullock
(74) *Attorney, Agent, or Firm*—Morgan & Finnegan LLP

(57) ABSTRACT

In a control system for controlling a plant system or process (22), a model based problem is formulated and an explicit control solution is constructed off-line such that a parametric profile (24) is constructed using parametric optimisation techniques (26). As a result the system can operate in real-time with significantly reduced computational burden.

25 Claims, 10 Drawing Sheets

U.S. PATENT DOCUMENTS

| | | | | |
|---|---|---|---|---|
| 5,257,206 | A * | 10/1993 | Hanson | 700/273 |
| H1357 | H * | 9/1994 | Ng et al. | 381/71.5 |
| 5,347,446 | A | 9/1994 | Iino et al. | |
| 5,347,447 | A | 9/1994 | Kiji et al. | |
| 5,477,449 | A | 12/1995 | Iino | |
| 5,572,420 | A * | 11/1996 | Lu | 700/33 |
| 5,691,895 | A * | 11/1997 | Kurtzberg et al. | 700/29 |
| 5,704,011 | A * | 12/1997 | Hansen et al. | 706/25 |
| 5,751,571 | A | 5/1998 | Tresp et al. | |
| 5,796,920 | A * | 8/1998 | Hyland | 706/20 |
| 5,884,037 | A * | 3/1999 | Aras et al. | 709/226 |
| 6,026,334 | A * | 2/2000 | Kayihan et al. | 700/28 |
| 6,056,781 | A | 5/2000 | Wassick | |
| 6,064,809 | A | 5/2000 | Braatz et al. | |
| 6,064,916 | A | 5/2000 | Yoon | |
| 6,085,183 | A | 7/2000 | Horn et al. | |
| 6,207,936 | B1 | 3/2001 | de Waard et al. | |
| 6,243,696 | B1 * | 6/2001 | Keeler et al. | 706/21 |
| 6,253,113 | B1 * | 6/2001 | Lu | 700/28 |
| 6,278,899 | B1 * | 8/2001 | Piche et al. | 700/44 |
| 6,445,963 | B1 * | 9/2002 | Blevins et al. | 700/44 |
| 6,487,459 | B1 * | 11/2002 | Martin et al. | 700/44 |
| 6,529,780 | B1 * | 3/2003 | Soergel et al. | 700/10 |
| 6,564,119 | B1 * | 5/2003 | Vaculik et al. | 700/146 |
| 6,745,087 | B2 * | 6/2004 | Shah | 700/29 |
| 6,816,810 | B2 * | 11/2004 | Henry et al. | 702/179 |
| 6,826,521 | B1 * | 11/2004 | Hess et al. | 703/12 |
| 6,937,966 | B1 * | 8/2005 | Hellerstein et al. | 703/2 |
| 7,039,473 | B2 * | 5/2006 | Corban | 700/20 |
| 7,158,566 | B2 * | 1/2007 | Dowling | 375/229 |
| 2003/0046130 | A1 * | 3/2003 | Golightly et al. | 705/7 |
| 2005/0137721 | A1 * | 6/2005 | Attarwala | 700/30 |
| 2006/0074501 | A1 * | 4/2006 | Hartman et al. | 700/29 |

FOREIGN PATENT DOCUMENTS

| | | |
|---|---|---|
| EP | 0745916 | 12/1996 |
| WO | WO 95/02213 | 1/1995 |
| WO | WO 00/41044 | 7/2000 |
| WO | WO 00/41045 | 7/2000 |
| WO | WO 00/65417 | 11/2000 |

OTHER PUBLICATIONS

Communication from European Patent Office dated Sep. 29, 2006.

Bemporad et al., "The Explicit Solution of Model Predictive Control via Multiparametric Quadratic Programming", in American Control Conference, Chicago, IL, Jun. 2000, pp. 872-876.

Bemporad et al., "Piecewise Linear Optimal Controllers for Hybrid Systems", in American Control Conference, Chicago, IL, Jun. 2000, pp. 1190-1194.

Borrelli et al., "A Hybrid Approach to Traction Control", in Hybrid Systems: Computation and Control, A Sangiovanni-Vincentelli and M.D. Di Benedetto, Eds. 2001, No. 2034 in Lecture Notes in Computer Science, pp. 162-174, Springer-Verlag. (published around Mar. 2001).

Bemporad et al., "Explicit Solution of LP-Based Receding Horizon Control", in Proceedings of the $39^{th}$ IEEE Conference on Decision and Control, Sydney, Australia, Dec. 2000, pp. 632-637.

Bemporad et al., Optimal Controllers for Hybrid Systems: Stability and Piecewise Linear Explicit Form, in Proceedings of the $39^{th}$ IEEE Conference on Decision and Control, Sydney, Australia, Dec. 2000, pp. 1810-1815.

Bemporad et al., "Model Predictive Control: A Multi-Parametric Programming Approach", in Proceedings of the European Symposium on Computer Aided Process Engineering-10, Florence, Italy, May 2000, pp. 301-306.

Bemporad et al., "Optimal Piecewise-Linear Control of Dry Clutch Engagement", in IFAC Workshop Advances in Automotive Control, Karlstruhe, Germany, Mar. 2001, pp. 23-28.

Bemporad et al., Performance Analysis of Piecewise Linear Systems and Model Predictive Control, Sydney, Australia, Dec. 2000, pp. 4957-4962.

Pistikopoulos et al., "On-Line Optimization via Off-Line Parametric Optimization Tools", Computers & Chemical Engineering, vol. 24, pp. 183-188, 2000.

Gal et al., Multiparametric Linear Programming. Management Science, 18: pp. 406-442, 1972.

Fiacco, "Introduction to Sensitivity and Stability Analysis in Nonlinear Programming", Academic Press, London, U.K., 1983.

Morari et al., "Model Predictive Control Toolbox", The Mathworks, Inc., 1994.

* cited by examiner (a) Region:
$x_1^* = [-10,10];$
$x_2^* = [-10,10]$ (a) Region magnification:
$x_1^* = [7.5, 8.5];$
$x_2^* = [-10,-9]$

PROCESS CONTROL USING CO-ORDINATE SPACE

FIELD OF THE INVENTION

The invention relates to improved process control, in particular improved model based process control.

BACKGROUND OF THE INVENTION

Modern automated processes such as manufacturing processes are implemented under strict and generally highly complex control regimes both to maximise efficiency and avoid error or failure. In their simplest form these regimes are typically based on a feedback system whereby a parameter of the process is monitored and fed to a controller as a control parameter for comparison with a target value, the state of the process being altered as a function of the control parameter to track the target value.

One known and widely adopted control regime is model predictive control (MPC) which is described in "Model Predictive Control; past, present and future." Morari, M. and J. H. Lee (1999) Comput. Chem. Engng. 23, 667-682 which is incorporated herein by reference. The basic principle is illustrated in FIG. 1, adapted from Prett, D. M. and Garcia C. E. (1988) "Fundamental Process Control", Butterworth Publishers, Boston. Using MPC, whilst the aim remains to track a target value, the controller at each control point—usually at discrete time intervals, not only monitors the existing state of the process, system or plant but estimates the state of the process at some point in the future, for example at the next time interval. References to control of a process in the following discussion can apply equally to plant or system control as appropriate.

Referring to FIG. 1, at a time t=k the current state is measured at point $x_k$ and its future states $x_{k+1}$ to $x_{k+p}$ are estimated for corresponding future times t=k to t=k+p. As can be seen the aim is for the value x to track a target value $x_{target}$. The control variable $u_t$ is similarly varied with time, its value for the next time increment being updated as the predicted state value is updated. As a result the system takes into account the effect that the current control variable will have on future states and accommodates that accordingly. The forward projection is carried out for a finite future period which is shifted forward incrementally at each measurement interval, termed a moving horizon policy.

This operation is carried out on-line and in real time, and is illustrated in FIG. 2. MPC operates by solving an optimization problem at each time interval based on measurements 10 from the process or plant 12 at that time. An optimiser 14 includes a process or plant model used to estimate the future behavior of the plant and an objective function to determine the optimal control strategy, ie variation of the control variable or corrective action 16, to reach the desired target.

Mathematically, the process or plant model can be represented, in state-space, by the equations:

$$\{x(t+1)=Ax(t)+Bu(t)$$

$$\{y(t)=Cx(t),\qquad(1)$$

$$y_{min} \leq y(t) \leq y_{max}$$

$$u_{min} \leq u(t) \leq u_{max}\qquad(2)$$

u represents the control variables or process inputs manipulated by the controller to control the process, x the process states, ie measured values representative of the current values of one or more process variables and y the process output measurements. For multi variable processes, x, y and u are of course vectors and A and B matrices. The output and control variables are bounded by the min and max values forming constraints on the process.

The equations represent mathematically how at a time t in a process the future state of the process at a discrete, subsequent time interval t+1 is predicted as a function of the measured state x at time t and the control variables applied at time t—this calculation is then iterated forward, still at time t, for the predicted state at time t+2 based on the calculation for time t+1 and so forth. At time t, in addition, the process output is a direct function of the instantaneous process state. The process output is calculated at equation (2) to ensure it does not exceed the ouput constraints.

It has been shown that the iteration up to a time $t+N_y$ can be posed in the form of the following problem to be optimised (for example, see Morari and Lee paper identified above):

$$\min_U J(U, x(t)) = x'_{t+Ny}|_t P x_{t+Ny}|_t + \sum_{k=0}^{N_y-1}(x'_{t+k}|_t Q x_{t+k}|_t + u'_{t+k} R u_{t+k})\qquad(3)$$

subject to $y_{min} \leq y_{t+k}|_t \leq y_{max}, k=1,\ldots,N_c$ $u_{min} \leq u_{t+k} \leq u_{max}, k=0,1,\ldots,N_c$ $x_t|_t = x(t)$ $x_{t+k+1}|_t = A x_{t+k}|_t + B u_{t+k}, k \geq 0$ $y_{t+k}|_t = C x_{t+k}|_t, k \geq 0$ $u_{t+k} = K x_{t+k}|_t, N_u \leq k \leq N_y$ where $U \triangleq \{u_t, \ldots, u_{t+Nu-1}\}$, Q=Q'>0, R=R'>0, P>0, $N_y \geq N_u$, and K is some feedback gain. The problem (3) is solved repetitively at each time t for the current measurement x(t) and the vector of predicted state variables, $x_{t+1|t}, \ldots, x_{t+k|t}$ at time t+1, ..., t+k respectively and corresponding control actions $u_t, \ldots, u_{t+k-1}$ is obtained.

Equation (3) is the iterated expansion of equation (1). The first term on the right hand comprises a quadratic function of the predicted state variables at time $t+N_y$, using the vector transpose x' and constant matrix P. The second term is a summation of all the intermediate predicted state variables from time t to time $t+N_y-1$ using the vector transpose x' and constant matrix Q and, over the same range, of corresponding control variables u again in quadratic form with constant matrix R. In both cases each successive state value $x_{t+k+1}$ is derived from the previous state value $x_{1+k}$ using equation 1. Each value of $u_{t+k}$ is derived as a function of the predicted state value for that time and gain matrix K. The constraints for y and u are controlled up to a time $N_c$. The function J is thus constructed.

The left hand side of equation (3) requires that an optimal solution is selected from the solution space by minimising the function J of the state x(t) and the vector U of control/input variables for all time intervals. The function J is minimised in control variable space, that is, the optimal value of U is found satisfying equation (3) including the various conditions in the "subject to" field such that J is minimum. The resulting values of u(t) and x(t) are then representable as shown in FIG. 1. The manner in which a real control situation can be represented as an MPC problem will be well known to the skilled person.

A significant problem arises in practical implementation of MPC as the processing power required for real time calculation is extremely high. Certainly if a large number of variables are required, complex control functions needed for complex processes or extremely short time intervals are desired, the burden can become cost, energy or even space inefficient. In addition, as the solution is created on-line and tailored only to instantaneous conditions, it provides no quantitative data on whether the model itself is appropriate.

Various attempts have been made to improve MPC implementation. For example in U.S. Pat. No. 6,056,781 to Wassick et al, in addition to a plant or process model, a disturbance model represents deviations from the plant model. In this version, if anything, the real time processing burden is enhanced. U.S. Pat. No. 5,347,446 to Iino et al describes a system taking into account constraints on the input or manipulated variables as well as constraints on controlled variables and change rates of the controlled variables. Again, the processing burden remains a significant concern.

U.S. Pat. No. 6,064,809 to Braatz et. al. addresses the problem of processing burden by approximating off-line the constraint set, that is; the limits or constraints on the input or manipulated variables as a mathematical construct off-line, in the form of an iteratively derived ellipsoid, effectively providing a simplified replacement for equation 3 above. However this simplified construct is then no more than an approximation which is scaled and then solved on-line in conventional MPC fashion. Accordingly Braatz et al. approached the problem by improving or simplifying the modeling process, but still requires significant on-line computational power.

SUMMARY OF THE INVENTION

According to the invention there is provided a method of deriving an explicit control solution for operation of a system, the system having a control variable and a measurable parameter, comprising the steps of constructing, off-line, a system operation model based on said control variable and measurable parameter, and constructing, off-line, an optimised explicit control solution for said control variable and measurable parameter using parametric optimisation. Because the solution is explicit and constructed off-line, on-line control of the system can be speeded up significantly using the solution. In addition the explicit solution can be reviewed off-line to provide insights into the control system/control model itself.

The explicit control solution is preferably stored on a data storage device such as a chip and the system operation model is preferably a model predictive control (MPC) model. The explicit control solution is preferably constructed in the continuous time domain allowing more accurate control. The MPC is preferably formulated as a Quadratic Program.

The control solution preferably comprises a co-ordinate space of at least one control variable value region comprising a control variable substitution value or a control variable value as a function of a measurable parameter value, the co-ordinate being the measurable parameter value. As a result a simple and manipulable parametric profile is provided. The measurable parameter may comprise a measurable state or a system disturbance. The method may further comprise the step of analysing the control solution and constructing a revised system model based on said analysis.

According to the invention there is further provided a method of controlling operation of a system comprising the steps of measuring, on-line, at a first time interval a parameter of the system, obtaining a control variable based on the measured parameter from a pre-defined parametric optimised explicit control solution and inputting the control variable to the system.

The steps of measuring the on-line state and deriving the control variable may be repeated at subsequent time intervals. The control solution preferably comprises a co-ordinate space of at least one control variable value region comprising a control variable substitution value or a control variable as a function of a measured state value, the co-ordinate being the measured state value.

According to the invention there is further provided a control system for controlling operation of a system having a control variable and a measurable state, the control system including a system state measurement element, a data storage element storing a predetermined parametric optimised explicit control solution profile, a processor arranged to obtain a control variable from said data storage element control solution based on a measured system state value and a controller arranged to input the obtained control variable to the system.

The method is preferably implemented in a computer program which can be stored in any appropriate computer readable medium. A data storage device is provided according to the invention storing a control solution derived by a method as herein described.

BRIEF DESCRIPTION OF THE DRAWINGS

Embodiments of the invention will now be described by way of example with reference to the drawings, of which.

DETAILED DESCRIPTION OF VARIOUS EXEMPLARY EMBODIMENTS

Figure 1:
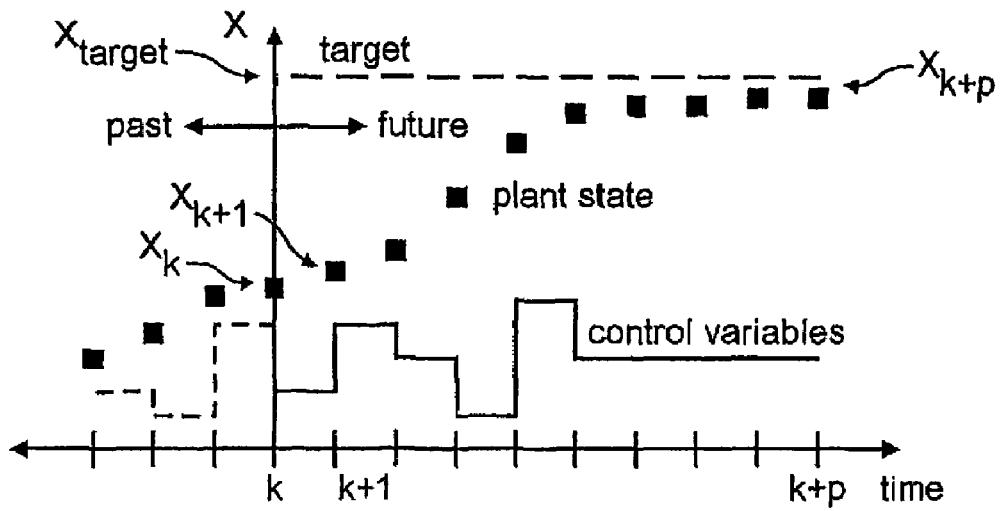
FIG. 1 shows a control strategy according to a model predictive control scheme.
Figure 2:
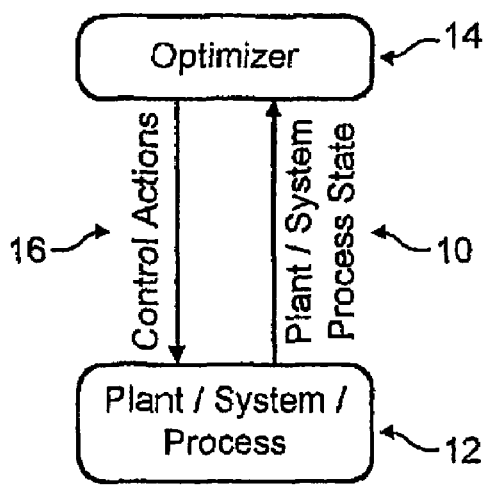
FIG. 2 shows schematically an on-line optimisation strategy.

The present invention provides an alternative, improved real time solution to the problems of model-based control for example using model predictive control. In particular, by applying the technique generally known as "parametric optimisation" to the process model the invention allows control variables to be derived off-line for all operational parameters that will be encountered. The explicit analytical control solution thus constructed is embedded in a chip or other data store as a function of the operational parameters such that the process model does not have to be optimised at each time interval, hence reducing the processing burden significantly. Instead the control variables are immediately available as a function of the operational parameters and/or in look-up table form. Yet further the solution is viewable off-line and offers information on the problem to be solved.

Parametric Optimisation

The techniques of parametric or optimisation or parametric programming will be well known to the skilled person and the general principles are set out in Gal, T. (1995) "Postoptimal Analyses, Parametric Programming and Related Topics", de Gruyter, New York and Dua, V. and E. N. Pistikopoulos (1999) "Algorithms for the Solution of Multiparametric Mixed-Integer Nonlinear Optimization Problems", Ind. Eng. Chem. Res. 38, 3976-3987 which are incorporated herein by reference. In essence parametric optimisation is a mathematical technique by which a problem is first formulated as an optimisation problem, an objective function and optimisation variables are obtained as a function of parameters in the optimisation problem, and the region in the parameter space where the functions are valid are also obtained. In the most general form the parametric optimisation problem can be formulated as:

$$z(\theta) = \min z = (d^T y + f(x))y, x$$

s.t. $Ey + g(x) \leq b + F\theta$ $\theta_{min} \leq \theta \leq \theta_{max}$ $x \in X \subseteq \mathfrak{R}^n$ $y \in Y = \{0, 1\}^m$ $\theta \in \Theta \subseteq \mathfrak{R}^s$, (4)

where y is vector of 0-1 binary variables, x is a vector of continuous variables, f is a scalar, continuously differentiable function of x, g is a vector of continuously differentiable functions of x, b and d are constant vectors, E and F are constant matrices, $\theta$ is a vector of parameters, $\theta_{min}$ and $\theta_{max}$ are the vectors of lower and upper bounds on $\theta$, and X and $\Theta$ are compact and convex polyhedral sets of dimensions n and s respectively.

This most general formulation requires minimisation of z, a function of optimization or control variables, x and y, to obtain them as a function of parameters which can be for example measurable states or system disturbances represented by vector $\theta$. The generalised formulation covers cases where the control variables are continuous value vectors x, or binary value vectors y. The parameter values $\theta$ are bounded by minimum and maximum constraints. In the example discussed below the parameter values are measurable states.

Solutions are known for various special cases. For example where there is no control variable y (ie no binary variables), f(x) is quadratic and convex in x, where f(x) is defined to be convex if for any $x_1, x_2 \in X$ and $0 \leq \alpha \leq 1$, $f[(1-\alpha)x_1 + \alpha x_2] \leq (1-\alpha)f(x_1) + \alpha f(x_2)$, and g(x) is linear in x, the problem is reduced to one of a multiparametric Quadratic Program (mp-QP). The solution to this case is discussed in Dua et al. "An algorithm for the solution of multi-parametric quadratic programs" (1999) tech. Rep. D00.7, Centre for Process Systems engineering, Imperial College London, which is incorporated herein by reference. An example of the form of the solution to an mp-QP problem set out in Table 1 is now discussed.

TABLE 1

| mp-QP Example: Mathematical Formulation |
|---|
| $z(\theta) = \min_{x_1, x_2} 0.0098x_1^2 + 0.0063x_1x_2 + 0.00995x_2^2$ |
| s.t. $x_1 \leq 0.417425 + 3.16515\theta_1 - 3.7546\theta_2$ |
| $-x_1 \leq 3.582575 - 3.16515\theta_1 - 3.7546\theta_2$ |
| $-0.0609x_1 \leq 0.413225 + 0.17355\theta_1 - 0.2717\theta_2$ |
| $-0.0064x_1 \leq 0.467075 + 0.06585\theta_1 + 0.4714\theta_2$ |
| $x_2 \leq 1.0902 + 1.8196\theta_1 - 3.2841\theta_2$ |
| $-x_2 \leq 2.9098 - 1.8196\theta_1 + 3.2841\theta_2$ |
| $0 \leq \theta_1 \leq 1$ |
| $0 \leq \theta_2 \leq 1$ |

As can be seen the function f(x) is a quadratic function of variables $x_1, x_2$. Each of $x_1$ and $x_2$ are further constrained dependent on state parameters $\theta_1, \theta_2$, which in turn are bounded. The function is minimised in control variable $x_1, x_2$ space, ie the values of $x_1, x_2$ are found for which f(x) is optimised.

Figure 3:
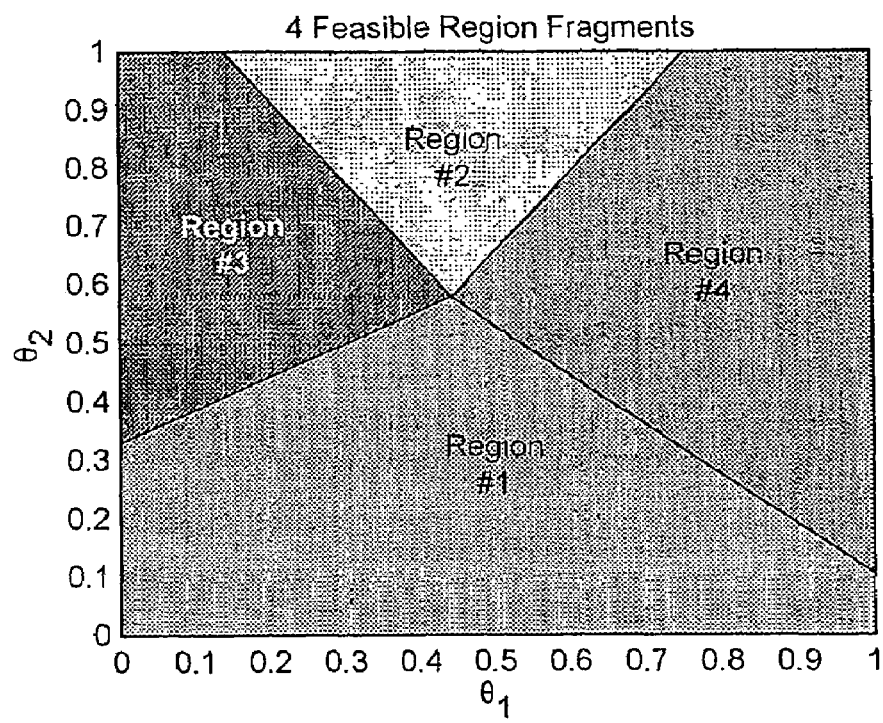
FIG. 3 shows an explicit control solution obtained by parametric optimisation.

The solution generated according to the Dua et. al. reference above takes the form of the plot in a coordinate space $\theta$ shown in FIG. 3. The axes are the state parameters $\theta_1, \theta_2$ respectively and optimisation of the mp-QP problem demonstrates that there are only four possible control variable states across the bounded range of $\theta$, represented by feasible regions #1 to #4 respectively. Accordingly, at any point in a process represented by the model in table 1, once state parameters have been measured, the region containing the coordinates ($\theta_1, \theta_2$) is identified and the control variable values $x_1, x_2$ are retrieved for that region. The control variables may be stored in the form of pure numbers or as simple optimised functions of $\theta_1, \theta_2$. In the specific example, where $t_1, t_2$ represent $\theta_1, \theta_2$ respectively, region definition as functions of $\theta_1, \theta_2$ and the values or functions for $x_1, x_2$ for each region are as follows:

Feasible region 1 x1=+0 x2=+0

−1*t1<=−0

+1*t1<=+1
-1*t2<=-0
+1*t1+1.18623*t2<=+1.13188
-1*t1+1.80485*t2<=+0.599143
Feasible region 2
x1=+3.16515*t1+3.7546*t2-3.58257
x2=+1.8196*t1-3.2841*t2+1.0902
+1*t2<=+1
-1.38941*t1-1*t2<=-1.19754
+1.34655*t1-1*t2<=+0.0209892
Feasible region 3
x1=-0.584871*t1+1.0556*t2-0.350421
x2=+1.8196*t2-3.2841*t2+1.0902
-1*t1<=-0
+1*t2<=+1
+1.38941*t1+1*t2<=+1.19754
+1*t1-1.80485*t2<=-0.599143
Feasible region 4
x1=+3.16515*t1+3.7546*t2-3.58257
x2=-1.00203*t1-1.18864*t2+1.13418
+1*t1<=+1
+1*t2<=+1
-1.34655*t1+1*t2<=-0.0209892
-1*t1-1.18623*t2<=-1.13188

It can be seen that for regions 1, $x_1$ and $x_2$ have fixed values, whereas for regions 2 to 4 $x_1$ and $x_2$ are expressed as functions of the coordinates ($\theta_1$, $\theta_2$)—it will be noted that $x_1$ and $x_2$ will thus vary within a given region dependent on their position in that region.

Another special case is where f(x) and g(x) are linear in x. The problem is then presented as a multiparametric Mixed Integer Linear Program (mp-MILP) for which algorithms have been developed as discussed in Acevedo J. and Pistikopoulos E. N. "A Multiparametric Programming Approach for Linear Process Engineering Problems under Uncertainty" (1997) Ind. Eng. Chem. Res. 36, 717-728 which is incorporated herein by reference.

An mp-MILP problem is set out in Table 2

Figure 4:
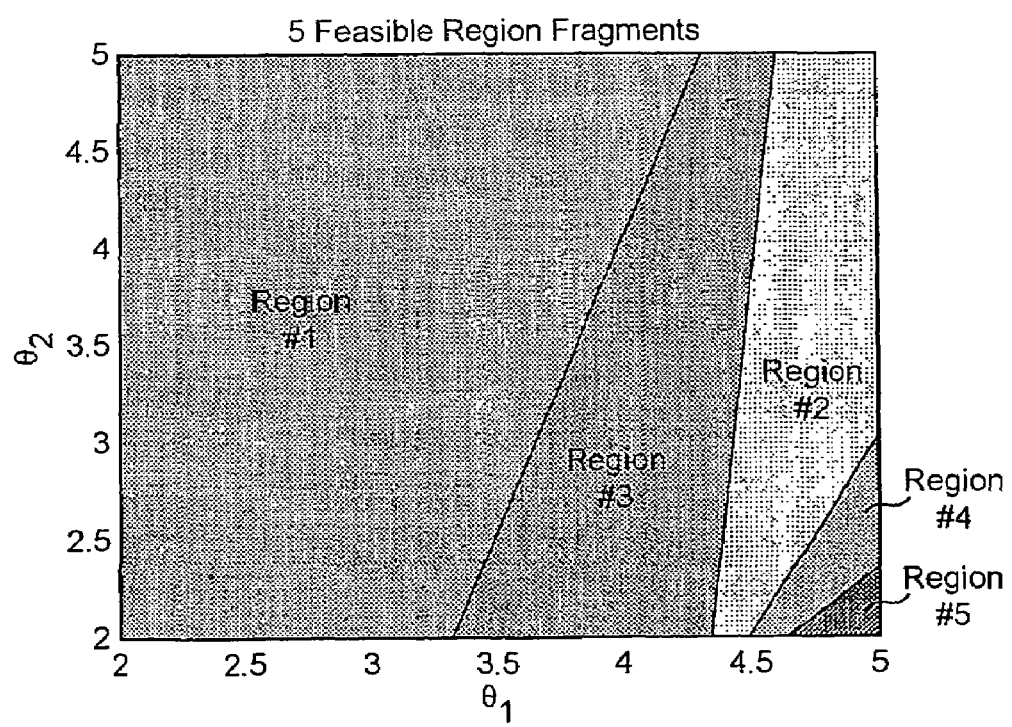
FIG. 4 shows an explicit control solution for an alternative parametric optimisation operation.

TABLE 2 mp-MILP Example: Mathematical Formulation $z(\theta) = \min - 3x_1 - 2x_2 + 10y_1 + 5y_2$
$y, x$
s.t. $x_1 \leq 10 + \theta_1$
$x_2 \leq 10 - \theta_1$
$x_1 + x_2 \leq 20$
$x_1 + 2x_2 \leq 12 + \theta_1 - \theta_2$
$x_1 - 20y_1 \leq 0$
$x_2 - 20y_2 \leq 0$
$-x_1 + x_2 \geq 4 - \theta_2$
$y_1 + y_2 \geq 1$
$x_n \geq 0, n = 1, 2$
$y_i \in \{0, 1\}, 1 = 1, 2$
$2 \leq \theta_s \leq 5, s = 1, 2.$ In this case f(x) and g(x) are linear functions of continuous variables $x_1$, $x_2$ and of binary variables $y_1$, $y_2$. The solution generated according to the Acevedo and Pistikopoulos reference above takes the form of the plot of $\theta_1$, $\theta_2$ shown in FIG. 4, in this case having five feasible regions with optimal solution as set out below:

Feasible region 1
$x_1=0$
$x_2=0.5*t1-0.5*t2+6$
Binary vector y=[0 1]
-1*t1<=-2
-1*t2<=-2
+3*t1-1*t2<=+8
+1*t2<=+5
Feasible region 2
$x_1=0.333333*t1+0.333333*t2+1.333333$
$x_2=0.333333*t1-0.666666*t2+5.333333$
Binary vector y=[1 1]
+1*t1<=+5
-1*t2<=-2
+2*t1-1*t2<=+7
-11*t1+1*t2<=-46
+1*t2<=+5
Feasible region 3
$x_1=0$
$x_2=-1*t1+10$
Binary vector y=[0 1]
-1*t2<-2
-3*t1+1*t2<=-8
+11*t1-1*t2<=+46
+1*t2<=+5
Feasible region 4
$x_1=-1*t1+1*t2+6$
$x_2=-1*t1+10$
Binary vector y=[1 1]
+1*t1<=+5
-1*t2<=-2
-2*t1+1*t2<=-7
+1*t1-1*t2<=+2.66667
Feasible region 5
$x_1=0$
$x_2=-1*t1+10$
Binary vector y=[0 1]
+1*t1<=+5
-1*t2<=-2
-1*t1+1*t2<=-2.66667 where t1 and t2 correspond to $\theta_1$ and $\theta_2$ respectively.

It will further be recognised that the presentation of the solution in this simple, explicit form offers insights into the control process as a whole. Most significantly, it indicates the extent to which the state measurements are required for process control. For example in more complex processes having a large number of measured states it is entirely possible that the explicit solution will turn out to be independent of one or more of the measured states as a result of which the process control hardware can be designed or modified to eliminate the corresponding state measurement device and the software to eliminate the processing of related measured state data so rendering the process control scheme for efficient and economic operation at all levels.

The skilled person will be aware of other special cases for which the parametric optimization solution is known and further discussion of those is thus not required here.

Application of Parametric Optimisation Techniques

Figure 5:
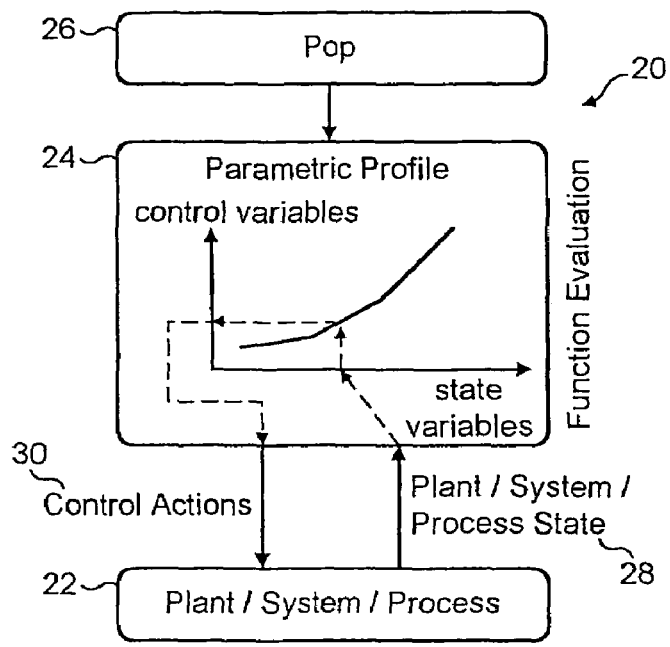
FIG. 5 shows schematically an on-line optimisation strategy according to the present invention.

Using these techniques a model-based problem can be optimised according to the present invention using parametric optimisation providing control actions as a function of measurements from a plant to be controlled, by defining the control variables as the optimisation variables and the state of the plant as parameters. Then, during real time operation, as soon as the measurements from the plant are obtained, this function is evaluated to obtain the control actions using the on-line optimisation routine designated generally 20 in FIG. 5.

According to this approach a model-based problem to be optimised is formulated for the plant/system/process 22 in a known manner. An explicit control solution, parametric profile 24, is constructed off-line using parametric optimisation techniques 26. In the simplified scheme shown, the profile is represented as a two-dimensional plot of state variables as input and control variables as output, but it will be appreciated that the profile can be multi-dimensional and include function evaluation dependent on the state variable defined region as discussed above with reference to FIGS. 3 and 4. In on-line operation of the plant 22, therefore, the state variables are entered to the profile as inputs 28 and the control actions 30 derived or looked up instantly and fed back to the plant 22. As a result the processing burden is shifted to the front end and on-line processing is minimised.

Returning to the MPC problem of equation (3); the function $J(U, x(t))$ can be formulated as a Quadratic Programming (QP) problem by expanding the formula set out in equation (3) for $x_{t+k+1}$ at time t as the summation:

$$x_{t+k}|_t = A^k x(t) + \sum_{j=0}^{k-1} A^j B u_{t+k-1-j} \quad (5)$$

This term is substituted into equation (3) to yield by simple algebraic manipulation the QP Problem:

$$J(U, x(t)) = \min_U \frac{1}{2} U'HU + x'(t)FU + \frac{1}{2}x'(t)Yx(t) \quad (6)$$
$$s.t. \ GU \leq W + Ex(t),$$

where $U \triangleq [u'_t, \ldots, u'_{t+Nu-1}]' \in \Re^s$, $s \triangleq mN_u$, is the vector of optimisation variables, $H=H^1>0$, and H, F, Y, G, W, E are obtained from Q, R and (3) and (5).

The QP problem represented by equation (6) can be formulated as the mp-QP again using simple algebraic manipulation:

$$\mu(x) = \min_z \frac{1}{2} z' Hz \quad (7)$$
$$s.t. \ Gz \leq W + Sx(t),$$

where $z \triangleq U+H^{-1}F'x(t)$, $z \in R^s$, represents the vector of optimisation variables, $S \triangleq E+GH^{-1}F'$ and x represents the vector of parameters.

It will be appreciated that the above derivation is performed based on predictions for discrete future intervals t, t+1 ... t+k i.e. in the discrete time domain, but similar techniques can be applied to obtain the mp-QP problem in the continuous time domain, i.e. continuing to take measurements at discrete intervals t, but predicting from those measurements future continuous profiles of the state variable at a time t+k where the intermediate intervals t+1 ... t+k−1 are infinitesimal.

In this case equation (6) is rewritten as:

$$\hat{\phi}(\theta) = \min_{x,v} \frac{1}{2} x(t_f)^T P_1 x(t_f) + \|P_2 x(t_f)\| + + \quad (8)$$
$$\int_{t_o}^{t_f} \left[ \frac{1}{2} x(t)^T Q_1 x(t) + \|Q_2 x(t)\| + \frac{1}{2} v(t)^T R_1 v(t) + \|R_2 v(t)\| \right] dt$$

s.t. $\dot{x}(t) = Ax(t) + Bv(t) + C\theta(t)$
initial condition (I. C.): $x(t_o) = x_o(\theta, v)$
$B_1 \cdot v(t_i) + A_1 \cdot x(t_i) + C_1 \cdot \theta(t_i) + b \leq 0$ $$\left. \begin{array}{l} y(t) = Dx(t) + Hv(t) + F\theta(t) \\ y_{\min} \leq y(t) \leq y_{\max} \\ t_0 \leq t \leq t_f \end{array} \right\} \text{Path Constraints}$$

$i = 0, 1, 2, \ldots N_f$ $\theta \in \Theta \subseteq R^s$ where A, B, C, $B_1$, $A_1$, $C_1$, H, D, F are time invariant matrices of dimensions n×n, n×m, n×s, q×m, q×n, q×s, r×m, r×n, r×s respectively and b is a vector of dimension n. $Q_1$, $P_1$, $R_1$, $P_2$, $Q_2$, $R_2$ are symmetric matrices. $x \in \Re^n$ is the vector of the state time dependent variables, $v \in \Re^m$ is the vector of the optimisation variables, $y \in \Re^z$ is the vector of algebraic variables including measurements and $\theta$ is the vector of the uncertain parameters. Note that the terms $x(t_f)^T P_1 x(t_f)$ and $$\int_{t_o}^{t_f} \left[ \frac{1}{2} x(t)^T Q_1 x(t) + \frac{1}{2} v(t)^T R_1 v(t) \right] dt$$

represent the 2-norm of the state and control variables from the origin, whereas the terms $\|P_2 x(t_f)\|$ and $$\int_{t_o}^{t_f} [\|Q_2 x(t)\| + + \|R_2 v(t)\|] dt$$

represent the 1- or ∞-norms of the state and control deviations from the set point. The time horizon $t_f$ of this problem is considered finite. The point constraints are imposed at $N_f$ discrete instants within the horizon. The optimisation variables, v, are called "control variables". The initial conditions set out in the "subject to" field comprise the control problem to be solved.

Note that in (8), we have integrals and differential equations in the continuous model, whereas in (3) we had summation in the objective function and discretized model. Problem (8) is described in (i) Anderson, B. D. and J. B. Moore (1989) "Optimal Control: Linear Quadratic Methods", Prentice Hall, Englewood Cliffs, N.J., (ii) Bryson, A. E. and Y. Ho (1975) "Applied Optimal Control", Taylor and Francis, New York, and (iii) Kwakernak, H. and R. Sivan (1972) "Linear Optimal Control Systems", Wiley Interscience, New York all of which are incorporated herein by reference.

The result of a parametric analysis on problem (8) is to express the optimal objective ($\phi$) and the optimisation variables (v) as a function of the parameters ($\theta$) for the complete space of the parameters variations. This can be achieved by transforming problem (8) to a form that can be solved with the current techniques of steady state parametric programming. Such a form in this case is the mp-QP formulation.

By adapting control vector parameterisation for solving the optimal control problem (e.g. "Off-line Computation of Optimum Controls for Plate Distillation Column" Pollard and Sargent, 1970 Automatica 6, 59-76, incorporated herein by reference), the optimisation problem can be considered only in the reduced space of v variables. This of course requires the explicit mapping of the x variables that appear in the constraints and the objective as a function of v,θ. This expression can be obtained by solving the linear ODE system in equation (8). The solution of this system is exact and in the case of time-invariant parameters and optimisation variables, is given by the analytical expression:

$$x(t, v, \theta) = e^{A(t-to)}x_o + e^{At}\int_{t_o}^t e^{-At}(Bv(t) + C\theta(t))dt \quad (9)$$

$e^{At}$ is the exponent of a matrix that is defined through eigenvalue or other decomposition analysis methods ("Matrix Computation", Second Edition Colub and Van Loan 1990, The John Hopkins University Press).

The integral evaluation in equation (9) requires that the form of the profile of the uncertainty and control variables over time be specified. Control variables are usually represented as piecewise polynomial functions over time where the values of the coefficients in the polynomial are determined during the optimization (Vassiliadis, V. S., R. W. H. Sargent and C. C. Pantelides (1994) "Solution of a Class of Multistage Dynamic Optimization Problems. 1. Problems without Path Constraints." Ind. Eng. Chem. Res. 33, 2111-2122 incorporated herein by reference). Note that if the order of the polynomial is assumed to be zero the control profiles correspond to a piecewise constant discretization. For the case of uncertainty, θ, it is described by using periodic harmonic oscillations, i.e. sinusoidal functions over time, of uncertain amplitude or mean value (Kookos, I. K and J. D. Perkins (2000) "An Algorithm for Simultaneous Process Design and Control", Tech. Rep. A019, Centre for Process Systems Eng., Imperial College, London incorporated herein by reference). Note that more complex, forms of periodic functions can be reduced to a linear combination of sinusoidal functions by using Fourier analysis. By substituting (9) into (8) and hence eliminating the system of differential equations the problem is transformed as follows:

$$\phi(\theta)\min_v = \frac{1}{2}x(t_f, v, \theta)^T P_1 x(t_f, v, \theta) + \quad (10)$$
$$\|P_2 x(t_f, v, \theta)\| + \int_{t_o}^{t_f}\left[\frac{1}{2}x(t, v, \theta)^T Q_1 x(t, v, \theta) + \right.$$
$$\left. \|Q_2 x(t, v, \theta)\| + \frac{1}{2}v(t)^T R_1 v(t) + \|R_2 v(t)\|\right]dt$$
$$\text{s.t.} \quad A_1 \cdot x(t_j, v, \theta) + B_1 \cdot v(t_i) + C_1\theta(t_i) + b \leq 0$$
$$y(t) = Dx(t, v, \theta) + Hv(t) + F\theta(t)$$
$$y_{\min} \leq y(t) \leq y_{\max}$$

By evaluating the matrix time integrals in equation (10), the objective function is expressed explicitly as a quadratic time invariant function of the parameters θ and the control variables v only. The same does not apply however, to the path constraints that are an explicit function of the control variables, the parameters and the time. The time dependence of such constraints renders problem (10) infinite dimensional. This difficulty is surpassed by applying the following methodology for converting the infinite dimensional path time-varying constraints to an equivalent finite number of point constraints:

1. Consider a finite number of interior point constraints that have to be satisfied only at particular points within the horizon.
2. Solve the optimization problem for this particular set of interior constraints.
3. Now test whether the same constraints are satisfied for every time instant during the complete time horizon.
4. If some of the constraints are violated at particular points $t_k$, then augment these points into Step 1 and continue until the constraints are satisfied for the complete time horizon.

This methodology transforms the path constraints that have to be satisfied throughout the complete time-horizon to an equivalent series of point constraints that hold only at particular time points and therefore, are inherently finite.

Hence the time in the path constraints of (10) is substituted by an appropriate set of fixed time instants $t_k$, k=1 ... K. Consequently the constraints become a linear function of the control variables and parameters only. Thus the equivalent mathematical description of problem (10) is the following:

$$\hat{\phi} = \min_v \frac{1}{2}(L_1 + L_2^T v + L_3^T \theta + v^T L_4 v + \theta^T L_5 v + \theta^T L_6 \theta) \quad (11)$$
$$\text{s.t.} \quad G_1 v \leq G_2 + G_3 \theta$$

where $L_1$ is a scalar constant and $L_2$, $L_3$, $L_4$, $L_5$ and $L_6$ are constant vectors and matrices of appropriate dimensions.

Problem (11) is now a multiparametric quadratic program (mp-QP) and its solution provides the control variables as a function of the state variables and uncertain parameters, similarly as in the discrete time case.

As a result, known parametric optimisation techniques for mp-QP problems can be applied to MPC problems in the discrete or continuous time domain to obtain the full solution set for z and hence u as an affine function of x of the form:

$$u = p^T x + q \quad (12)$$

where p is a constant vector and q is a scalar constant, for the complete feasible space of x (ie. the full available range of control variables) using appropriate algorithms and techniques such as those set out in the Dua et. al. reference identified above and as will be well-known to the skilled person. This is all performed off-line, such that on-line the only control calculations are those of evaluating or solving the functions derived for the control variables.

A limitation of the system described above is that it does not take into account model inaccuracies and constant disturbances except to the extent that the disturbances can be modeled as additional parameters. Accordingly inaccurate forecasting of the process behavior can lead to infeasabilities such as off-specification production, excessive waste disposal or even hazardous plant operation. Below there are discussed two general methodologies for compensating for disturbances.

In real processes there are usually disturbances due to sensor malfunctioning, degrading performance of the process or system due to catalyst fouling, noise, human error or mistake, cost or model inaccuracies, amongst other possible factors. These disturbances cannot always be measured and accordingly it is desirable to take such disturbances into account in deriving the optimal control law.

Rewriting equation (3) above, an appropriate formulation for deriving an explicit model-based control law for a process system is as follows:

$$\varphi(x_{t|0}) = \min_{v_{1|s}^N} x_{t|N}^T P x_{t|N} + \sum_{k=0}^{N-1}[y_{t|k}^T Q y_{t|k} + v_{t|k}^T R v_{t|k}] \quad (13)$$

-continued $$s.t.\ x_{t|k+1} = A_1 x_{t|k} + A_2 v_{t|k}$$
$$y_{t|k} = B_1 x_{t|k} + B_2 v_{t|k}$$
$$x_{t|0} = x^*$$
$$0 \geq g(y_{k|t}, x_{k|t}, v_{k|t}) = C_o y_{t|k} + C_1 x_{t|k} + C_2 v_{t|k} + C_4$$
$$k = 0,1,2 \ldots N$$

where $x \in X \subseteq \Re^n$ are the states, $y \in \Re^m$, are the outputs and $v \in \Re^q$ are the controls. The outputs are the variables that we aim to control, i.e. to drive to their set-point $y^o$, (which might be temperatures, concentrations) whereas the states are the variables that fully characterize the current process conditions (which might be enthalpies, internal energies, volume). $v^N$ denotes the sequence of the control vector over the receding horizon. Note that in (13) the outputs participate in the objective function instead of the states. Since the outputs are linear function of the states, with proper rearrangement on the weighting matrix Q this formulation (13) is equivalent to equation (3) above.

By considering the current states $x_t$ as parameters, problem (13) is recast as a multiparametric quadratic program (mp-QP) of the form given in (7). The solution of that problem corresponds to an explicit control law for the system that expresses the optimum control action in terms of the current states. The mathematical form of this parametric controller, similar to that given in (12), is as follows:

$$v_{ct|0}(x^*) = a_c x^* + b_c;$$

$$CR_c^1 x^* + CR_c^2 \leq 0$$

for $c=1, \ldots, N_c$ \hfill (14)

where $N_c$ is the number of regions in the state space. Matrices $a_c$, $CR_c^1$ and vectors $b_c$, $CR_c^2$ are determined from the solution of the parametric programming problem and the index c designates that each region admits a different control law. Vector $v_{ct|0}$ is the first element of the control sequence, similar expressions are derived for the rest of the control elements.

The model-based parametric controller described in the previous paragraph does not account for the impact of persistent slowly varying unmeasured disturbances and uncertainties of the type discussed above that either enter the system as inputs or derive from modelling errors and time varying process characteristics. These disturbances result in an offset, i.e. a permanent deviation, of the output variables from their target values and additionally may cause constraint violations. As discussed below, according to the invention two possible solution techniques are introduced: Proportional Integral (PI) control, and origin re-adjustment. The suitable model readjustment according to disturbance estimates, enables the recursive on-line adaptation of the model based controller to the current conditions.

Figure 6:
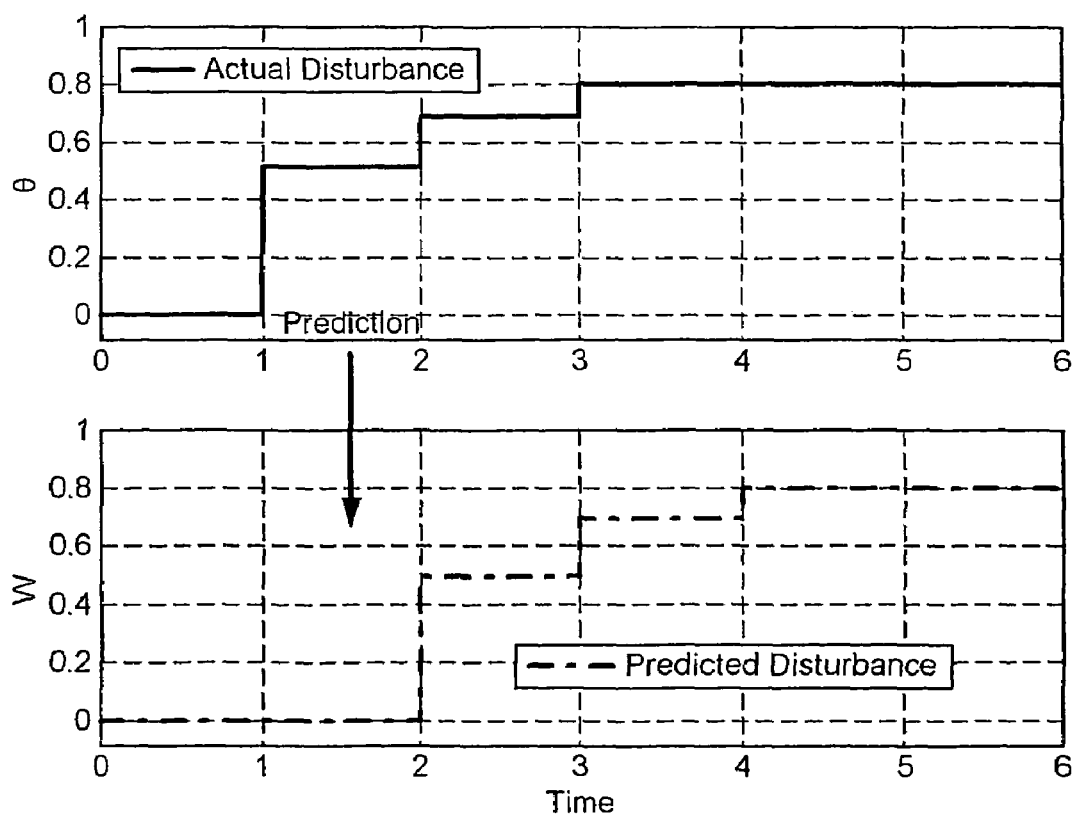
FIG. 6 shows the disturbance performance of various control strategies including those according to the present invention.

FIG. 6 illustrates the situation where a step disturbance enters and propagates in a plant controlled by the controller discussed above. In the illustration shown in FIG. 6 "conventional parco" refers to a model-based controller according to the discussion above whereas "PI-parco" refers to parametric PI. It can be seen from the resultant profile shown in FIG. 7 of the controlled output that it is driven closer to the set point but there is an off-set between the set point $y_{set}$, in this case $y_{set}=0$ and the output y:

$$\Delta y = y - y_{set} \hfill (15)$$

The reason for the off-set is that the model has not predicted the presence of the disturbance.

Following the fist approach according to the invention, to eliminate the off-set an integral state is incorporated in the model-based optimisation framework. This provides off-line derived parametric proportional integral controller ("Parametric PI"). As discussed in more detail below, in particular an integral state is added into the dynamic system, and is also added in the objective function with a particular waiting penalty. The updated problem is solved again to obtain the model-based parametric control law discussed above.

In conventional feedback control schemes, Seborg et al., (1989) "Process Dynamics & Control", Wiley & Sons, integral action is incorporated for attenuating any permanent deviation of the output variables from their set-points due to the presence of disturbances. This gives rise to the so-called proportional integral controller (PI-controller). Here, the incorporation of the integral action for the same purpose is achieved by introducing an integral state that is equal to the anticipated deviations of the output from its reference point, usually the origin. This state is augmented as an additional quadratic penalty in the objective function (Kwakernaak and Sivan, 1972) "Linear Optimal Control Systems", John Wiley & Sons Ltd. This technique has also been adopted by the Generic Model Control framework (Lee and Sullivan, 1988 "Generic Model Control (GMC)" Comput. Chem. Eng. 12(6), 573-580), but in that control scheme no state constraints or other model characteristics are considered and on-line optimization is required for deriving the control actions. Equation (13) after the incorporation of the integral state is modified as follows:

$$\varphi(x_{t|0}) = \min_{v_{k|t}^N} x_{t|N}^T P x_{t|N} + \mathbf{xq_{t|N}^T P_1 xq_{t|N}} + \hfill (16)$$

$$\sum_{k=0}^{N-1} [y_{t|N}^T Q y_{t|k} + v_{t|N}^T R v_{t|k} + \mathbf{xq_{t|k}^T Q_1 xq_{t|k}}]$$

$$s1.\ x_{t|k+1} = A_1 x_{t|k} + A_2 v_{t|k}$$
$$y_{t|k} = B_1 x_{t|k} + B_2 v_{t|k}$$
$$\mathbf{xq_{t|k+1} = xq_{t|k} + y_{t|k}}$$
$$x_{t|0} = x^*$$
$$\mathbf{xq_{t|0} = xq^*}$$
$$0 \geq g(y_{k|t}, x_{k|t}, v_{k|t}) = C_o y_{t|k} + C_1 x_{t|k} + C_2 v_{t|k} + C_4$$
$$k = 0, 1, 2 \ldots N$$
$$\mathbf{xq_{t|k} \in R^m}$$

where xq is the integral state; $Q_1$, $P_1$ are the quadratic costs corresponding to that state. Note that the terms in bold take into account integral action and are the additional terms when comparing to (13).

Equation (16) and the associated conditions effectively introduce the additional state xq as an additional term in the objective function and as an additional condition dependent on the preceding integral state value and the respective output.

By eliminating the equalities associated with the dynamic system and considering the current pure and integral states as parameters a multiparametric quadratic program similar to equation (7) is formulated. The solution of this mp-QP corresponds to the following piecewise affine control law:

$$v_{ct|0}(x^*) = a_c x^* + b_c + d_c xq^*;$$

$$CR_c^1 x^* + CR_c^2 + CR_c^1 xq^* \leq 0$$

for $c = 1, \ldots N_c$ (17)

which is similar to that given in equation (12).

The piecewise affine multivariable controller represented by equation (4) contains a proportional part $a_c x_t(t^*)$ with respect to the states, an integral part $d_c\, xq_t$ in terms of the outputs and a bias $b_c$, hence it is a parametric proportional integral controller (Parametric PI). This control law is asymptotically stable, thus it guarantees no steady state offset from the target point on condition that (i) the dimension of the controls is larger or equal to the output dimension $q \geq m$, which is the prevailing case in control problems (ii) the open-loop transfer matrix defined from the equation: $H(s) = B_1)(sI - A_1)^{-1}A_2 + B_2$ posses no zeros at the origin and (iii) the quadratic cost matrix $Q_1$ that penalizes the integral error is positive-definite.

Similarly, derivative action can be accommodated in the parametric control law. An algebraic variable is introduced in the formulation that is equal to the difference between the current and the preceding output variable. This variable is penalized in the objective function as follows:

$$\varphi(x_{t|0}) = \min_{v_{k|t}^N} j x_{t|N}^T P x_{t|N} + x q_{t|N}^T P_1 x q_{t|N} + \qquad (18)$$

$$\sum_{k=0}^{N-1} [y_{t|k}^T Q y_{t|k} + v_{t|k}^T R v_{t|k} + x q_{t|k}^T Q_1 x q_{t|k} + y d_{t|k}^T Q_z y d_{t|k}]$$

s.t. $x_{t|k+1} = A_1 x_{t|k} + A_2 v_{t|k} \quad k = 0, 1, 2, \ldots N$ $y_{t|k} = B_1 x_{t|k} + B_2 v_{t|k} \quad k = 0, 1, 2, \ldots N$ $xq_{t|k+1} = xq_{t|k} + y_{t|k} \quad k = 0, 1, 2, \ldots N$ $yd_{t|k+1} = y_{t|k+1} - y_{t|k} \quad k = 0, 1, 2, \ldots N-1$ $x_{t|0} = x^*$ $xq_{t|0} = xq^*$ $0 \geq g(y_{k|t}, x_{k|t}, v_{k|t}) = C_o y_{t|k} + C_1 x_{t|k} + C_2 v_{t|k} + C_4$ $\quad k = 0, 1, 2 \ldots N$ $yd_{t|k} \in \mathbb{R}^m$ The solution of this problem leads to a parametric controller featuring explicit derivative action, i.e. a parametric proportional integral derivative (parametric PID) controller results. Unlike the integral action incorporation, here, the states of the system remain unaltered. Since the derivative function penalizes the rate of change of the output trajectories, it has the advantage of achieving faster settling times and hence improved disturbance rejection (Seborg, et al., 1989 ibid).

This system does not necessitate the existence of a disturbance or uncertainty estimator since this is taken into consideration implicitly via integral action. The method does not modify the prediction model according to the current disturbance realization. In order to prevent the resultant model based controller failing to locate accurately and promptly the constraint bounds leading to possible constraint violations when operating dynamically near the feasible region boundaries, the known technique of back-off is applied, where the output set-point is moved away from the constraints (e.g. Narraway and Perkins, 1993). Integral and derivative action can be accounted for separately giving rise to parametric PI and parametric PD controllers respectively, or they can be used simultaneously resulting in a parametric PID controller.

The parametric PID controller is not obtained by purely including extra terms in pre-derived control expressions, but is based on systematically modifying the original model-based optimal control formulation and solving the resulting parametric optimization problem with implicit additional terms.

Accordingly, the solution space comprises one or more regions each with an explicit control law but taking into account disturbances by optimising for all PI/PID actions and obtaining the control action solution explicitly as a function of the states, the integral xq and the derivatives yd of the outputs. This allows systematic enhancement of the control law as opposed to existing solutions which are based on ad-hoc integral/derivative control tuning.

The second approach is a model readjustment approach that enables the recursive on-line adaptation of the model based controller to current conditions. According to this system, as described in more detail below, depending on an estimate of the disturbance a new optimum steady state point can be identified in terms of the states and controls. The explicit control law derived off-line by parametric optimisation as described in equations (3) and (4) is modified to incorporate the presence of the disturbance in an on-line operation, in effect shifting the solution space.

In known systems, the incorporation of a disturbance regulator in an MPC controller is performed by estimating the disturbance values and updating the model accordingly to ensure nonzero output target tracking (Li et al., 1989 "A state space formulation for model predictive control" AIChE J. 35(2), 241-248; Muske and Rawlings, 1993 "Model Predictive Control with Linear Models" AIChE J. 3a(2), 262-287; Loeblein and Perkins, 1999 "Structural design for on-line process optimisation "I. Dynamic Economics of MPC" AIChE J. 45(5) 1018-1029). A problem with these known solutions is that, in effect, control law is obtained as a result of which the solution can be predicted only by repetitive solution on-line of optimization problems. As a result useful information concerning the model and process is lost.

According to the invention, a mechanism is generated for updating the model on-line and modifying accordingly the derived control law. A distinction is made between two systems (i) one being the real process plant and (ii) the other comprising a model that represents an estimate of the process behavior, as shown in Table 3:

TABLE 3

Real vs. Prediction Model

| Real System | Prediction Model |
|---|---|
| $x_{t|k+1} = A_1 x_{t|k} + A_2 v_{t|k} + W\theta_{t|k}$ | $X_{t|k+1} = A_1 x_{t|k} + A_2 v_{t|k} + Ww_t$ |
| $y_{t|k} = B_1 x_{t|k} + B_2 v_{t|k} + F\theta_{t|k}$ | $y_{t|k} = B_1 x_{t|k} + B_2 v_{t|k} + Fw_t$ | where vector $\theta$ is the actual disturbance vector that enters the system, whereas w is the disturbance estimate. Vector w is modelled as a step disturbance, thus being constant over the receding horizon, but admitting a different realization every time a piece of information about the process plant is available. It will be seen that in the real system the estimated term is $W\theta_{t|k}$. This is distinguished from the condition for x in equation (3) in that any additional term there would be a derived, model-based term, i.e. where a model had been incorporated for the disturbance. In real life $\theta$ can not be measured as considered in equation (3).

Once a disturbance enters into the system, at time k, there is an anticipated discrepancy z between the measured output ŷ and the predicted output y. This is computed one interval after the disturbance has propagated i.e. at k+1:

$$z_{t|k+1} = z_{t|k} + (\hat{y}_{t|k} - y_{t|k}) \quad (19)$$

Based on the assumption that the disturbance that generated the discrepancy retains the same value in the following interval its estimation is evaluated via rearranging to provide:

$$w_t = (B_1 W + F)^P z_{t|k} \quad (20)$$

where $(B_1 W + F)^P$ is the pseudo-inverse of matrix $B_1 W + F$. This algebraic manipulation performs disturbance estimation via the recursive least square method (Stengel, 1994 "Optimal Control & Estimation" Dover Publications, Mineda, N.Y.). Otherwise, a more realistic Kalman filter estimator can be used. Note that if the size of the disturbances is the same as the size of the outputs then this estimation method is exact since the pseudo-inverse reduces to the inverse of the matrix sum. However, even in that case it is rare that the actual disturbance value is the same as the estimated one since there are usually hidden errors in the used model.

Based on the disturbance value a new steady state point [$x_s$, $v_s$] is computed. If the dimension of output variables y is equal to the dimension of input controls v and no input and state constraints are violated in the new steady state, then this is done as follows:

At steady state: (21)

$$x_{t|k+1} =$$

$$x_{t|k} = x_s \Rightarrow x_s = Ax_2 + Bv_s \Rightarrow \begin{bmatrix} I - A_1 & -A_2 \\ B_1 & B_2 \end{bmatrix} \cdot \begin{bmatrix} x_s \\ v_s \end{bmatrix} = \begin{bmatrix} W \cdot w \\ -F \cdot w \end{bmatrix}$$

Otherwise if q=dim (v)≧m=dim (y) and there are no active state constraints, the evaluation of the new steady state point requires the solution of the following optimization problem (Muske and Rawlings, 1993 ibid):

$$\min_{x_s, v_s} (v_s - v^o)^T R_s (v_s - v^o) \quad (22)$$

$$\begin{bmatrix} I - A_1 & -A_2 \\ B_1 & B_2 \end{bmatrix} \cdot \begin{bmatrix} x_s \\ v_s \end{bmatrix} = \begin{bmatrix} W \cdot w \\ -F \cdot w \end{bmatrix}$$

$$v_{min} \leq v_s \leq v_{max}$$

where $v^o$ are the prior-to-disturbance control nominal values, usually taken as $v^o=0$; similarly $y^o$ are the output nominal set-points, usually $y^o=0$. The case where there are more measurements than controls results usually in an infeasible problem since not all the outputs can be driven to their original set-points. Hence, a new set-point has to be calculated that is as close as possible to the previous one. This is done by solving the following optimization problem:

$$\min_{x_s, v_s} (y^o - B_1 v_s - B_2 v_s - Fw)^T Q_s (y^o - B_1 v_s - B_2 v_s - Fw) \quad (23)$$

$$[I - A_1 - A_2] \cdot \begin{bmatrix} x_s \\ v_s \end{bmatrix} = [W \cdot w]$$

$$v_{min} \leq v_s \leq v_{max}$$

After the computation of the new appropriate steady state, the control law is shifted as follows:

$$v_{ct|0}(x^*) = a_c(\hat{x}^* - x_s) + v_s + b_c;$$

$$CR_c^1 (x^* - x_s) + CR_c^2 \leq 0$$

for c=1, ..., $N_c$ (24)

Note that when y=x then the solution of (21) will generate $x_s = y^o = 0$, which is the target value for the outputs. The optimizations (22, 23) are to be performed on line, thus resulting in rigorous computations during the determination of the appropriate control law adjustment. Alternatively, by considering the predicted disturbances w as parameters these quadratic optimization problems are reformulated as multiparametric quadratic programs that are readily solved by the mp-QP algorithms (Dua et al., 2000 "An Algorithm for the solution of Multi-parametric Quadratic Programs" (1999) tech. Rep. D00.7, Centre for Process Systems engineering, Imperial College London). The solution of these mp-QP problems provides piecewise affine expressions of the readjusted steady state point as a function of the disturbance, $v_s(w_t)$, $x_s(w_t)$. Hence, the evaluation of the updated steady state reduces to simple function evaluations irrespective of the problem characteristics.

The derivation of the modified control law (24) is based on the assumption that (i) no pure state or mixed input, output, state constraints are violated during its implementation and (ii) that no input bounds are exceeded, for example, ($v_{t|0} v_{max}$) after shifting on-line the steady state. If either of these conditions occur, the optimum control policy is determined by incorporating the disturbances $w_t$ explicitly in the parametric quadratic optimization problem (13) giving rise to the formulation:

$$\varphi(x_{t|0}) = \min_{v_{k|t}^N} x_{t|N}^T P x_{t|N} + \sum_{k=0}^{N-1} [y_{t|k}^T Q y_{t|k} + v_{t|k}^T R v_{t|k}] \quad (25)$$

$$s.t. \quad x_{t|k+1} = A_1 x_{t|k} + A_2 v_{t|k} + W w_t$$

$$y_{t|k} = B_1 x_{t|k} + B_2 v_{t|k} + F w_t$$

$$x_{t|0} = x^*$$

$$0 \geq g(y_{k|t}, x_{k|t}, v_{k|t}) = C_o y_{t|k} + C_1 x_{t|k} + C_2 v_{t|k} + C_4$$

$$k = 0, 1, 2 \ldots N$$

In problem (25) both the current states $x_t$ and the disturbances $w_t$ are treated as parameters that remain constant throughout the receding horizon. The control law that is obtained by solving this problem, has a piecewise affine form that includes a feedforward element $d_c w_t$:

$$v_{ct|0}(\hat{x}^*) = \bar{a}_c \hat{x}^* + v_s + \bar{b}_c + \bar{d}_c w;$$

$$\overline{CR}_c^1 (\hat{x}^*) + \overline{CR}_c^2 + \overline{CR}_c^3 w \leq 0$$

for c=1, ..., $N_c$ (26)

The disturbances values $w_t$ are updated according to their estimation (equation 20) every time a new output measurement is available. Next, they are provided regularly along with the current state values to the explicit control law described in (26) and the new control sequence is computed. As a result there is no need for information about the disturbance to be obtained via measurements, allowing a more realistic disturbance estimator to be introduced.

As a result the control law is first obtained and an origin readjustment is introduced onto it in the form of a direct disturbance estimate as a result of which the disturbance does riot always need to be included as a parameter. As discussed above, the disturbance is obtained on-line and the control law updated by specifying the disturbance term more and more accurately as additional information is obtained concerning the disturbance, using algebraic manipulation as set out in equations (19) to (26). The resulting solution is more computationally attractive for off-line processing as a specific disturbance parameter does not need to be incorporated into the parametric programming. The on-line processing is, in practice, extremely straightforward and quick.

Figure 7:
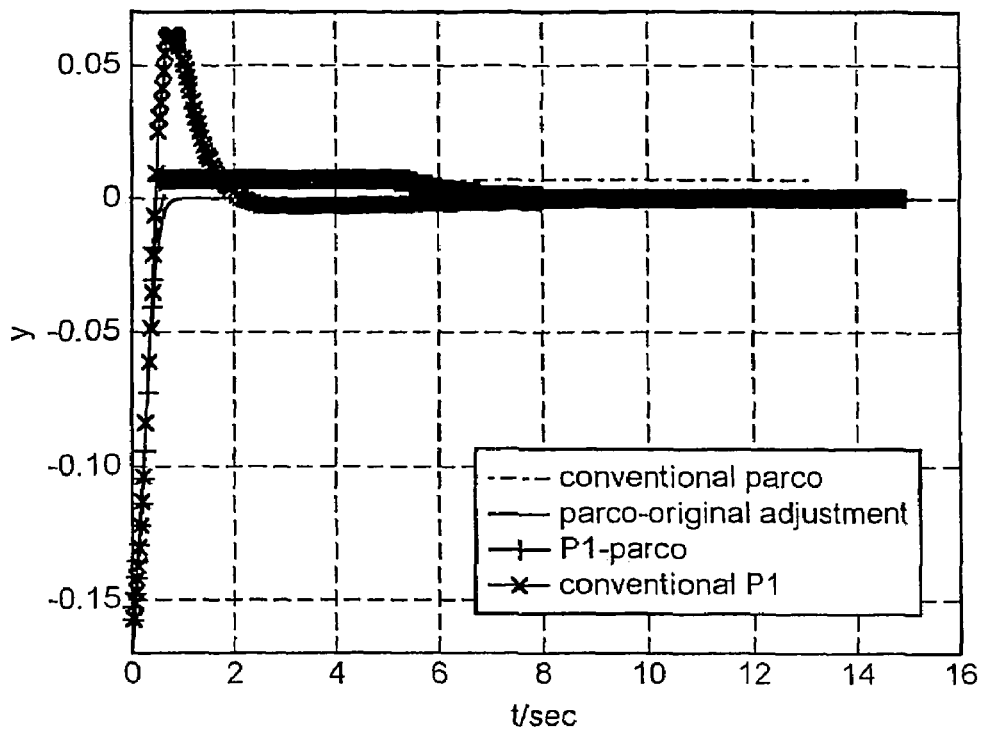
FIG. 7 shows the difference between actual and predicted disturbance in a controller according to the present invention.

Referring to FIG. 7 the difference between the actual disturbance (upper trace, θ) and the predicted disturbance (lower trace, w) can be seen.

Set point tracking is treated in a similar fashion by including a variational term $y^{ref}$ the right band side of equation (21), i.e.: replace $$\begin{bmatrix} Ww \\ -Fw \end{bmatrix} \text{ for } \begin{bmatrix} Ww \\ -Fw + y^{ref} \end{bmatrix}.$$

Hence, the new steady state in terms of state and control values is calculated accordingly. In case of state constraint violations the reference point is treated as a parameter and included explicitly in the control law. The readjustment of the control law is readily performed without an additional computational burden during the design of the parametric controller. On the other hand the parametric PID controller requires the incorporation of an additional state for each output, thus, increasing the order of the dynamic system and consequently the computations during the derivation of the control law. The controller achieves output feedback by readjusting automatically its tunings to account for the presence of disturbances. In the absence of any information about the source of disturbances and uncertainties matrices W and F are not known. In that case, term $Fw_t$ is ignored and term $Ww_t$ in the prediction model, is replaced by a single uncertainty vector $w_{t|k}$. Then, the estimation of the updated target point $x_s$, $v_s$ suffers from inaccuracy resulting permanent steady state deviations from the reference point. This phenomenon has also been observed by other researchers in the area of on-line control and optimization (Visser, 1999 "A Feedback based implementation Scheme for batch process optimisation" Phd Dissertation Ecole Polytechnique Federale de Lausanne). The treatment of this offset is carried out by incorporating integral action as in the parametric proportional integral controller design. This combination of the two methodologies, i.e. parametric PID controller and model readjustment leads to an enhanced controller design that adopts the advantages of the two distinct approaches. The corrective action of the controller featuring this technique applies only after the disturbance estimation occurs. Thus, the methodology is liable to constraint violations when the disturbance occurs while the process operates on the constraint boundary. The violation lasts until the predictive mechanism recognizes the disturbance, which happens on the next sampling time interval, enabling the model-based controller to compensate for it. Back-off can also be used here for preventing such situations.

It will be appreciated that the invention can be put into effect in any appropriate way. For example the algorithms involved may be implemented in any appropriate software, for example using the MATLAB software package sold by The Math Works Inc. A specific example of the techniques used in a real control problem is set out below.

SPECIFIC EXAMPLE

An example of parametric optimisation as applied to MPC in relation to a conventional process is now described with reference to FIG. 8. The problem is based on that studied in "Procedure for regulating control structure selection with application to the FCC process" Hovd, M. and Skogestad, S. (1993) AIChE J. 39, 1938. A fluidised catalytic cracker (FCC) designated generally 40 is used in the refinery process to crack heavier hydrocarbons to high Octane number gasoline and includes a regenerator 42 having a dense bed region 56 and dilute bed region 58, and a reactor-separator 44 having a riser 45. Heavy hydrocarbons are introduced at an inlet 46 at the bottom of the reactor-separator 44 and are mixed with hot catalyst which enters at rate $F_s$ controlled by a valve 49 via line 48 from the regenerator 42. As the mixture rises through the reactor-separator 44 the heavy hydrocarbons break down to (i) lighter hydrocarbon products and (ii) coke. The coke is deposited on the catalyst and reduces its activity.

The products are collected at the top of the reactor separator 44 from outlet line 50 and the spent catalyst is recycled back to the regenerator 42 via return line 52. At the bottom of the regenerator 42 air is fed at rate $F_a$ controlled by a valve 53 via a line 54 to burn the coke and regenerate the spent catalyst. Exhaust gas 60 escapes the regenerator 42 to a flue.

For this problem the control variables are $F_s$ and $F_a$, and the state variables are $C_{rc}$, the mass fraction of coke in the regenerator 42 and $T_{rg}$, the temperature in the catalyst bed in the regenerator. The target values for the state variables are:

$\hat{C}_{cr} = 5.207 \times 10^{-3}$ $\hat{T}_{rg} = 965.4K$ and the index of performance is made up of the control and state integral square derivation from their nominal economically optimum operating point.

The optimisation problem therefore is to manipulate the control variables to attain these state values using the continuous time model described above for an mp-QP using equation (8) rewritten as:

$$\phi(x_o) = \min_v \frac{1}{2} x_f^T P x_f + \frac{1}{2} \int_{to}^{tf} [x^T Q_1 x + 10^{-3} v^T R_1 v] dt$$

$$\frac{dx}{dt} = Ax + Bv$$

$$y = Dx + Hv$$

Constraints $x_{\min} \leq x \leq x_{\max}$ $y \leq y_{\max}$ $v_{\min} \leq v \leq v_{\max}$ Current State: $x(t_o) = x_o$ Economically Optimum Steady State Point $$x = \begin{bmatrix} C_{cr} - \hat{C}_{cr} \\ T_{rg} - \hat{T}_{rg} \end{bmatrix}; \quad v = \begin{bmatrix} F_s - \hat{F}_s \\ F_a - \hat{F}_a \end{bmatrix}; \quad y = T_{cy} - \hat{T}_{cy} \quad (27)$$

$\hat{T}_{rg} = 965.4K, \hat{C}_{cr} = 5.20710-3, \hat{T}_{cy} = 988.1K,$ $\hat{F}_a = 28 \text{ kg/s}, \hat{F}_s = 294 \text{ kg/s}$ $x_{max} = \begin{bmatrix} 20\%\hat{C}_{cr} \\ 34.6 \end{bmatrix}, \quad x_{min} = \begin{bmatrix} -20\%\hat{C}_{cr} \\ 65.4 \end{bmatrix},$ $v_{max} = \begin{bmatrix} 106 \\ 32 \end{bmatrix}, \quad v_{min} = \begin{bmatrix} -194 \\ -28 \end{bmatrix} \quad y_{max} = 11.9$ Equation (27) hence represents a function to be minimised formulated in a manner that will be well known to the skilled person and based, here, on the work in the Hovd & Skogestad reference identified above.

Matrices A, B, D, H are derived from the model process and are given in the Hovd and Skogestad reference (see Annex A to the present description). The matrices in the cost function Q, R are considered as (Pantas, A. V. (1999) Robustness and Economic Considerations in the Design of Multivariable Optimal Controllers, PhD Thesis, Imperial College, University of London):

$$Q = \begin{bmatrix} 1 & 0 \\ 0 & 1 \end{bmatrix}, \quad R = \begin{bmatrix} 10^{-3} & 0 \\ 0 & 10^{-3} \end{bmatrix}.$$

Matrix P that is associated with the final cost is obtained from the solution of the continuous Lyapunov equation $A^T P + PA + Q = 0$ (Lewis, F. L. and V. L. Syrmos, (1995) Optimal Control $2^{nd}$ Ed. John Wiley and Sons, New York) in order to guarentee stability for the closed-loop system. The appropriate finite control horizon for this problem is calculated based on feasibility and stability criteria developed in Chmielewski, D. and V. Manousiouthakis (1996) On Constrained Infinite Time Linear Quadratic Optimal Control, Systems and Control Letters 29, 121-129 and the value obtained is $t_f = 6$ min. The control variables are discretized as piecewise constant functions on 4 equal in size elements $v = [u_1, u_2, u_3, u_4]$. The number of elements is a function of the sampling time (determined from well-established guidelines in Seborg, D. E., T. F. Edgar and D. A. Mellichamp (1989) Process Dynamic and Control, Wiley and Sons) and control horizon. Each control element applies at a different time interval in the receding time horizon, i.e.:

For $t_0 \leq t \leq t_1 \Rightarrow v = u_1$

For $t_1 \leq t \leq t_2 \Rightarrow v = u_2$

For $t_2 \leq t \leq t_3 \Rightarrow v = u_3$

For $t_3 \leq t \leq t_4 \Rightarrow v = u_4$ (28)

where $t_0 = 0$ min, $t_1 = 1.5$ min, $t_3 = 4.5$ min and $t_4 = t_f = 6$ min. For this control description the analytical solution of the dynamic system (27) provides the following state time profiles:

For $t_o \leq t \leq t_1$ (29)

$x(t) = e^{A(t-to)}x_o + [e^{A(t-to)} - I]A^{-1}Bu_1$

For $t_1 \leq t \leq t_2$ $x(t) =$ $e^{A(t-to)}x_o + [(e^{A(t-to)} - e^{A(t-t1)})A^{-1}B(e^{A(t-t1)} - I)A^{-1}B]\begin{bmatrix} u_1 \\ u_2 \end{bmatrix}$ For $t_2 \leq t \leq t_3$ $x(t) = e^{A(t-to)}x_o + [(e^{A(t-to)} - e^{A(t-t1)})A^{-1}B(e^{A(t-t1)} -$ $e^{A(t-t2)})A^{-1}B(e^{A(t-t2)} - I)A^{-1}B]\begin{bmatrix} u_1 \\ u_2 \\ u_3 \end{bmatrix}$ For $t_3 \leq t \leq t_4$ $x(t) = e^{A(t-to)}x_o + [(e^{A(t-to)} - e^{A(t-t1)})A^{-1}B(e^{A(t-t2)} -$ $e^{A(t-t3)})A^{-1}B(e^{A(t-t3)} - I)A^{-1}B]\begin{bmatrix} u_1 \\ u_2 \\ u_3 \\ u_4 \end{bmatrix}$ Once these state functions (29) are substituted in the objective and the constraints of problem (27) the only free optimisation variables become the control elements: $u_1, u_2, u_3, u_4$. The mathematical form of the resulting problem is:

$$\phi(x_o) = \min_v \int_{to}^{t1} \{x_o^T e^{A^T(t-to)}Qe^{A(t-to)}x_o + \quad (15)$$

$u_1[B^T A^{-T}(e^{A(t-to)} - I)^T Q(e^{A(t-to)} - I)A^{-1}B +$ $10^{-3}R]u_1\}dt +$ $\int_{to}^{t1}\{x_o^T[(Q(e^{A(t-to)} - I)A^{-1}B) + (Q(e^{A(t-to)} - I)A^{-1}B)^T]u_1\}dt +$ $\int_{t1}^{t2}\left\{x_o^T e^{A^T(t-to)}Qe^{A(t-to)}x_o + \right.$ $\left. x_o^T[W_2]\begin{bmatrix} u_1 \\ u_2 \end{bmatrix} + \begin{bmatrix} u_1 \\ u_2 \end{bmatrix}^T [S_2]\begin{bmatrix} u_1 \\ u_2 \end{bmatrix}\right\}dt +$ $\int_{t2}^{t3}\left\{x_o^T e^{A^T(t-to)}Qe^{A(t-to)}x_o + x_o^T[W_3]\begin{bmatrix} u_1 \\ u_2 \\ u_3 \end{bmatrix} + \right.$ $\left. \begin{bmatrix} u_1 \\ u_2 \\ u_3 \end{bmatrix}^T [S_3]\begin{bmatrix} u_1 \\ u_2 \\ u_3 \end{bmatrix}\right\}dt +$ $\int_{t3}^{t4}\left\{x_o^T e^{A^T(t-to)}Qe^{A(t-to)}x_o + x_o^T[W_4]\begin{bmatrix} u_1 \\ u_2 \\ u_3 \\ u_4 \end{bmatrix} + \begin{bmatrix} u_1 \\ u_2 \\ u_3 \\ u_4 \end{bmatrix}^T [S_4]\begin{bmatrix} u_1 \\ u_2 \\ u_3 \\ u_4 \end{bmatrix}\right\}$ $dt + x_o^T e^{A^T(t1-to)}Pe^{A(t1-to)}x_o +$ -continued $$x_o^T[W_1]\begin{bmatrix}u_1\\u_2\\u_3\\u_4\end{bmatrix} + \begin{bmatrix}u_1\\u_2\\u_3\\u_4\end{bmatrix}^T[S_4]\begin{bmatrix}u_1\\u_2\\u_3\\u_4\end{bmatrix}$$

Constraints

For $t_o \leq t \leq t_1$ $$x_{min} \leq e^{A(t-t_o)}x_o + [e^{A(t-t_o)} - I]A^{-1}Bu_1 \leq x_{max}$$

$$y_{min} \leq D \cdot (e^{A(t-t_o)}x_o + [e^{A(t-t_o)} - I]A^{-1}Bu_1) + Hu_1 \leq y_{max}$$

For $t_1 \leq t \leq t_2$ $$x_{min} \leq$$

$$e^{A(t-t_o)}x_o + \left[(e^{A(t-t_o)} - e^{A(t-t_1)})A^{-1}B(e^{A(t-t_o)} - I)A^{-1}B\right]\begin{bmatrix}u_1\\u_2\end{bmatrix} \leq x_{max}$$

$$y_{min} \leq D \cdot e^{A(t-t_o)}x_o + [(e^{A(t-t_o)} - e^{A(t-t_1)})A^{-1}B(e^{A(t-t_1)} - I)A^{-1}B]\begin{bmatrix}u_1\\u_2\end{bmatrix} + H\begin{bmatrix}u_1\\u_2\end{bmatrix} \leq y_{max}$$

For $t_2 \leq t \leq t_3$ $$x_{min} \leq e^{A(t-t_o)}x_o + [(e^{A(t-t_o)} - e^{A(t-t_1)})A^{-1}B(e^{A(t-t_1)} - e^{A(t-t_2)})A^{-1}B(e^{A(t-t_2)} - I)A^{-1}B]\begin{bmatrix}u_1\\u_2\\u_3\end{bmatrix} \leq x_{max}$$

$$y_{min} \leq D \cdot \left(e^{A(t-t_o)}x_o + [(e^{A(t-t_o)} - e^{A(t-t_1)})A^{-1}B(e^{A(t-t_1)} - e^{A(t-t_2)})A^{-1}B(e^{A(t-t_2)} - I)A^{-1}B]\begin{bmatrix}u_1\\u_2\\u_3\end{bmatrix}\right) + H\begin{bmatrix}u_1\\u_2\\u_3\end{bmatrix} \leq y_{max}$$

For $t_3 \leq t \leq t_4$ $$x_{min} \leq e^{A(t-t_o)}x_o + [(e^{A(t-t_o)} - e^{A(t-t_1)})A^{-1}B(e^{A(t-t_1)} - e^{A(t-t_2)})A^{-1}B(e^{A(t-t_2)} - e^{A(t-t_3)})A^{-1}B(e^{A(t-t_3)} - I)A^{-1}B]\begin{bmatrix}u_1\\u_2\\u_3\\u_4\end{bmatrix} \leq x_{max}$$

$$y_{min} \leq D \cdot \left(e^{A(t-t_o)}x_o + [(e^{A(t-t_o)} - e^{A(t-t_1)})A^{-1}B(e^{A(t-t_1)} - e^{A(t-t_2)})A^{-1}B(e^{A(t-t_2)} - e^{A(t-t_3)})A^{-1}B(e^{A(t-t_3)} - I)A^{-1}B]\begin{bmatrix}u_1\\u_2\\u_3\\u_4\end{bmatrix}\right) + H\begin{bmatrix}u_1\\u_2\\u_3\\u_4\end{bmatrix} \leq y_{max}$$

$$v_{min} \leq \begin{bmatrix}u_1\\u_2\\u_3\\u_4\end{bmatrix} \leq v_{max}$$

Current State: $x(t_o) = x_o$

The time varying terms $S_2$, $S_3$, $S_4$, $S_f$, $W_2$, $W_3$, $W_4$, $W_f$, are obtained from the problem matrices, A, B, Q, R, P via matrix multiplications. By evaluating the matrix time integrals in equation (30) the objective is expressed explicitly as a quadratic time-invariant function of the current state $x_o$ and the control elements $u_i$ only. The same does not apply however, to the constraints that are an explicit function of the control elements, the current state and the time. The time dependence of the constraints renders problem (30) infinite dimensional. This difficulty is surpassed by applying the methodology for converting the infinite number of path time-varying constraints to an equivalent finite set of point constraints described in the text earlier. Hence, time t in the exponentials of equation (30) is substituted by an appropriate set of time fixed instants $t_k$, k=1, ... K. Consequently, the constraints become a linear function of the control elements and the current states only. Thus, the equivalent mathematical description of problem after appropriate algebraic manipulations (30) is the following:

$$\phi(x_o) = \min_{u_1,u_2,u_3,u_4}\left\{x_o^T L_6 x_o + x_o^T L_5\begin{bmatrix}u_1\\u_2\\u_3\\u_4\end{bmatrix} + \begin{bmatrix}u_1\\u_2\\u_3\\u_4\end{bmatrix}^T L_4\begin{bmatrix}u_1\\u_2\\u_3\\u_4\end{bmatrix}\right\} G_1\begin{bmatrix}u_1\\u_2\\u_3\\u_4\end{bmatrix} \leq \quad (31)$$

$$G_2 + G_3 x_o$$

$$x_{min} \leq x_o \leq x_{max}$$

Figure 9:
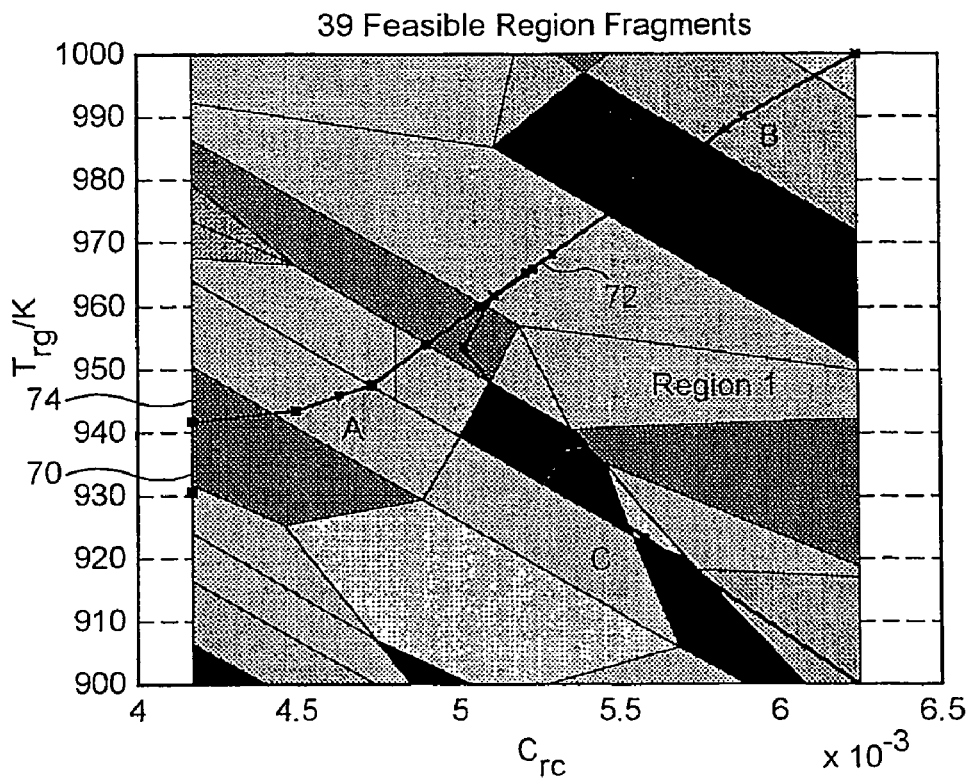
FIG. 9 shows an explicit control solution obtained for the unit of FIG. 8.

Problem (31) is a multiparametric quadratic program that is solved using the well-established mp-QP algorithm (set out in the Dua et al. reference identified above) and the matrix and other values for the solution to the specific example are provided in the annex. The solution of this problem provides an explicit mapping of the control action as a function of the current state. This mapping represents the optimal control law for the process system. The control law is partitioned to 39 regions, as shown in FIG. 9 where each region corresponds to a different control-state feedback expression. For example the region denoted as [1] in FIG. 9 is defined by the inequalities:

$$-960.25C_{cr}-0.033T_{rg}<-36.2$$

$$-2865.7C_{cr}+0.0289T_{rg}<12.83$$

$$2801.4C_{cr}+0.0289T_{rg}<42.163 \quad (32)$$

In that region the feedback control law for the first control element is given by the equations:

$$F^1_s=400F^1_a=2477.2C_{cr}-0.3014T_{rg}+316.04 \quad (33)$$

The parametric solution shown in FIG. 9 comprises once again a plot of feasible control variable regions against the state parameters $C_{rc}$ and $T_{rg}$, each region in the space of $C_{rc}$ and $T_{rg}$ corresponding to a control strategy for the coordinates $(C_{rc}, T_{rg})$ falling in the region of the type shown in equation (33). Certain regions only are numbered for purposes of clarity. Also shown in FIG. 9 is an actual control strategy for each of three different initial states:

Initial State

1. $-\cdot C_{rc0}=4.166 \cdot 10^{-3}$
   $T_{rg0}=930.8K$
2. $-\times C_{rc0}=6.25 \cdot 10^{-3}$
   $T_{rg0}=1000K$
3. $-+C_{rc0}=6.25 \cdot 10^{-3}$
   $T_{rg0}=900K$ In the first case the state parameters progress from a starting point 70 for $(C_{rc}, T_{rg})$ at $(4.166 \times 10^{-3}, 930.8)$ to the target point 72 at $(5.207 \times 10^{-3}, 965.4)$. It will be seen that the starting point 70 falls in region 15 which is described by the following constraints:

$$774.447749675638 C_{rc} - 0.000002890173 T_{rg} \leq 3.22866305270312$$

$$-0.096024582293 C_{rc} - 0.0000010647451 T_{rg} \leq -0.01023882532278$$

$$0.149763287968 C_{rc} + 0.000002890173 T_{rg} < 0.00331692082836$$

In this region the control functions governing the control variable values are given by:

$$F_s = 4.5202 \times 10^{11} C_{rc} + 1.3605 \times 10^{-15} T_{rg} + 400$$

$$F_a = 52096.8241100885 C_{rc} + 0.0581707153 T_{rg} - 230.5624037352$$

And substituting the starting point coordinates $(4.166 \times 10^{-3}, 930.8)$ for $(C_{rc}, T_{rg})$ provides the control actions:

$$F_s = 400$$

$$F_a = 40.62$$

Figure 8:
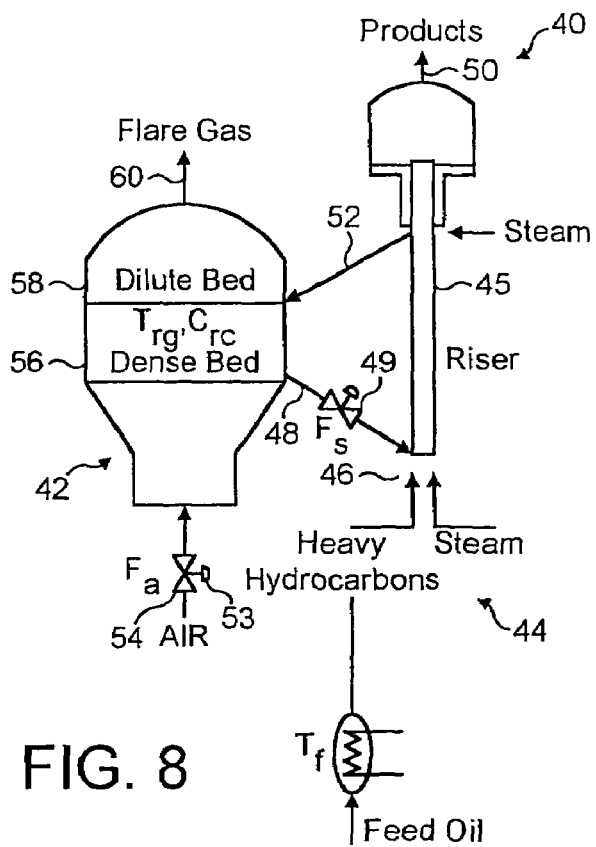
FIG. 8 shows schematically a fluidised catalytic cracking unit modeled according to the present invention.

Reverting to FIG. 8 these variables are input by controlling the input values 49, 53 respectively, and the state parameters are measured again at the next measurement interval 74. This falls in another region and so the corresponding calculations are repeated to obtain the corresponding control variables. The step is repeated defining a path A until the target point 72 is reached, following which corrective action will be implemented as appropriate. Paths B and C represent control policies implemented similarly from the second and third initial states listed above.

Figure 10A:
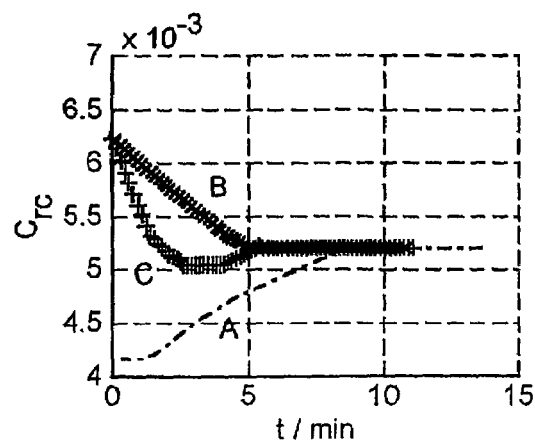
FIG. 10a shows the time profile of the measurable states for the control strategy shown in FIG. 9.
Figure 10B:
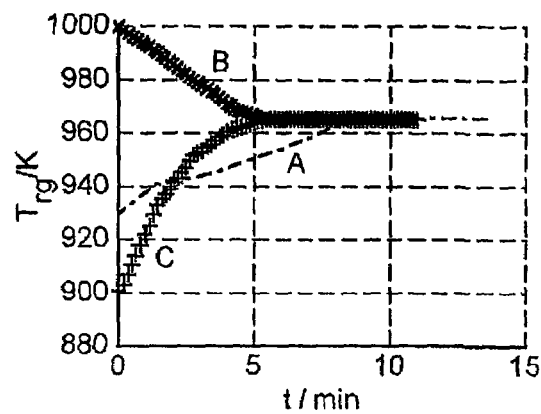
FIG. 10b shows the time profile of the measurable states for the control solution shown in FIG. 9.

FIGS. 10a and 10b show the corresponding state profiles for the process for each of the state variables $C_{rc}, T_{rg}$ against time from which it can be seen that both variables stabilise at the target values quickly under the control scheme.

Figure 11A:
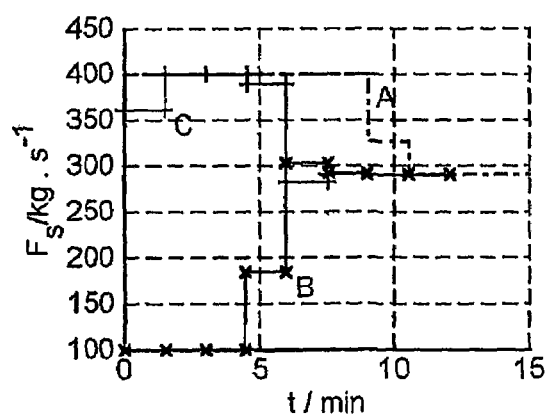
FIG. 11a shows the trajectory followed in state space for the control variables under the control solution of FIG. 9.
Figure 11B:
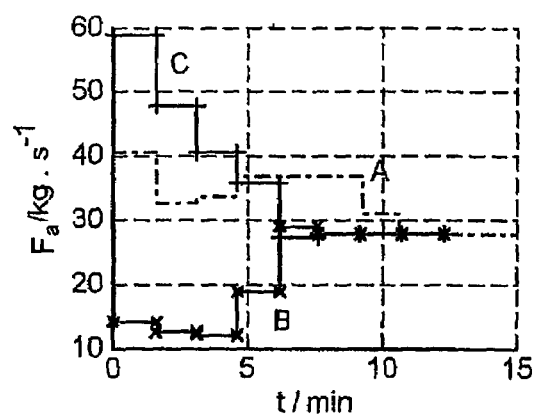
FIG. 11b shows the trajectory followed in state space for the control variables under the control solution of FIG. 9.

Similarly FIGS. 11a and 11b show the corresponding stepwise variations in the control variables $F_s, F_a$ against time, in state space, for each path A, B and C, varying at each measurement interval and stabilising to corrective variations once the process reaches its target point. Excellent performance is achieved by the controller since even the perturbation of magnitude 20% are attenuated in 5-10 minutes despite the time constant of the system being 60 minutes.

Figure 12:
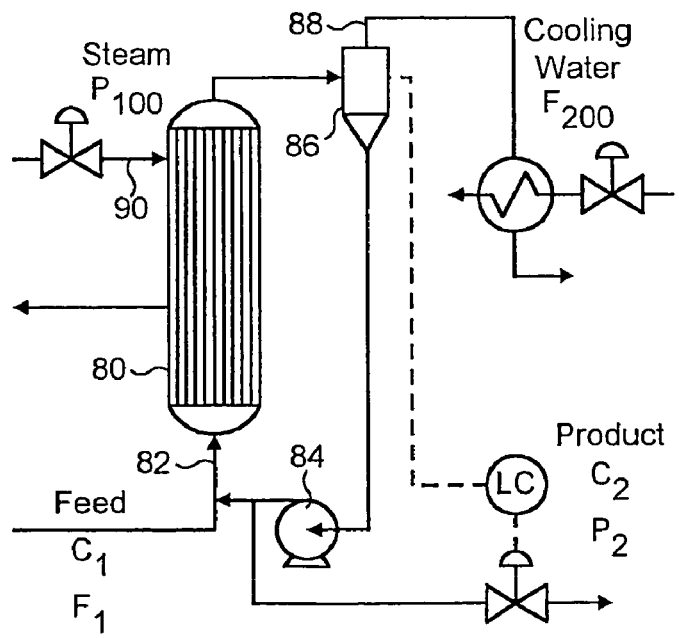
FIG. 12 shows schematically an evaporator unit modeled according to the present invention.

To demonstrate the disturbance rejection features of the present invention we consider an example concerned with determining the control policy for an evaporator process shown in FIG. 12, studied by Newell and Lee (1989) "Appied Process Control—A case study" Prentice-Hall, Sydney. The system removes the volatile component from a mixture containing a volatile and a non-volatile material, thus resulting a product rich in the non-volatile component. This is an industrial process used in industries such as alumina production, sugar mills and paper manufacture. FIG. 12 displays the flowsheet of the process that consists of a heat exchanger vessel 80 where the feed 82 is heated up until it evaporates, a flash tank, a recirculating pump 84 and a process condenser 86 that condenses the volatile by-product. The level of the tank is assumed to be perfectly controlled via the product stream leaving the process with two manipulating input variables, i.e. the cooling water flow 88 in the condenser $F_{200}$ and the utility steam pressure $P_{100}$ 90 entering the evaporator. The controlled outputs in this process are the pressure $P_2$ and the temperature of the product stream $C_2$. For the purpose of designing the explicit control law for this system, the model is linearized at $x_n = [C_2 \; P_2]^T = [25\% \; 50.57 \; KPa]^T$, $v_n = [P_{100} \; F_{200}]^T = [193.447 \; 207.323]^T$. which is the nominal steady state optimum operating point. The design of the parametric controller is based on the following mathematical formulation:

$$\varphi(x_{t|0}) = \min_{v_{k|t}^N} x_{t|N}^T P x_{t|N} + \sum_{k=0}^{N-1} [y_{t|k}^T Q y_{t|k} + v_{t|k}^T R v_{t|k}]$$

s.t. $x_{t|k+1} = A_1 x_{t|k} + A_2 v_{t|k}$ $y_{t|k} = x_{t|k}$ $x_{t|0} = x^*$ $k = 0, 1, 2 \ldots N$ $A_1 = \begin{bmatrix} -0.1966 & -0.1882 \\ 0.0199 & -0.0559 \end{bmatrix}$;

$A_2 = \begin{bmatrix} 0.0483 & 0 \\ 0.0097 & -0.0018 \end{bmatrix}$;

$Q = \begin{bmatrix} 1/5 & 0 \\ 0 & 1/1057 \end{bmatrix}$;

$R = 10^{-3} \begin{bmatrix} 1 & 0 \\ 0 & 1 \end{bmatrix}$ $2457 \leq C_2 \leq 30$ $40 \leq P_2 \leq 80$ $120 \leq P_{100} \leq 265$ $140 \leq F_{200} \leq 275$ Nominal Operating Point:

$\hat{C}_2 = 21.5\%, \hat{P}_2 = 50.57 \; KPa, \hat{P}_{100} = 193.447 \; KPa,$
$\hat{F}_{200} = 207.323 \; kg/min$ Nominal values of input disturbances:

$\hat{F}_1 = 10 \; kg/min, \hat{C}_1 = 5\%.$

Figure 13:
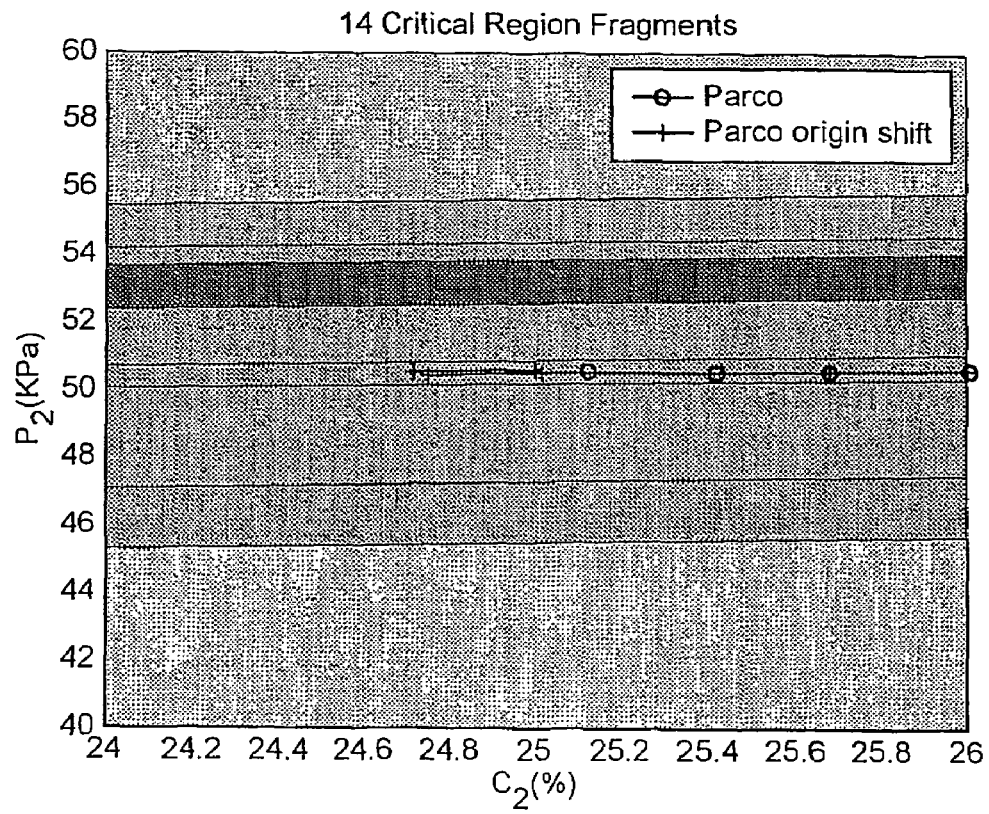
FIG. 13 shows a control solution according to the present invention without utilising disturbance rejection.

A sampling time of $\Delta t = 0.5$ min is used for deriving the discrete-time state space linear dynamic model and the calculated control time horizon is $t_f = 1.5 \; min \equiv N = 3$. Similar to the first example of the Catalytic Cracking unit, a parametric control law is derived here, partitioned in to 14 regions as shown in FIG. 13. For example in Region 13 the control law is given by the equation:

$$P_{100} = -3.9017 \cdot 10^1 C_2 + 0.23142 P_2 + 1157.1$$

$$F_{200} = -1.2305 \cdot 10^2 C_2 + 6.2814 \cdot 10^2 P_2 - 2.8462 \cdot 10^4$$

and the region boundaries are described by:

$$46.262 \leq -0.2C_2 + 0.209P_2 \leq 46.912$$

$$15.951C_2 - 9.46 \cdot 10^{-2}P_2 \leq 473$$

$$-0.2 \cdot C_2 \leq -4.8$$

FIG. 13 also shows the path of the state variables with only Parco (i.e. the base concept of parametric optimisation control) and Parco together with origin adaptive adjustment.

Next, the problem is rearranged to include integral action in the optimum control scheme. The problem is formulated as in equation (16) and hence, a parametric proportional integral controller is derived. The integral weight in the objective function is:

$$Q_1 = \begin{bmatrix} 4/100 & 0 \\ 0 & 5/300 \end{bmatrix}$$

The control law is partitioned into 54 regions each one corresponding to different expressions between the control variables and the pure and integral states. Note that in this case the space of state variables, $C_2$, $P_2$, $C_2^q$ and $P_2^q$ is in four dimensional vs. the two dimensional space shown in FIG. 13 where the integral action was not incorporated. The control law for the 20$^{th}$ region CR20 and the inequalities defining the boundaries of this region are shown below. Alternatively, disturbance estimate and origin readjustment is implemented for disturbance rejection purposes as explained above. The original control law corresponding to FIG. 13 is shifted in an optimum manner every time a variation in the disturbances $F_1$, $C_1$ occurs.

Figure 14:
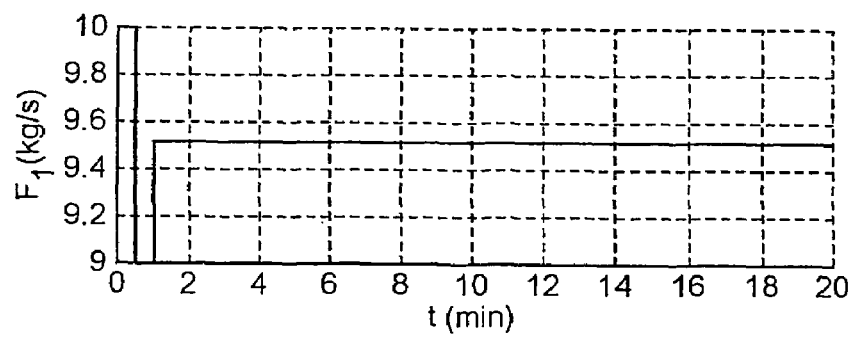
FIG. 14 shows the time profile of the measurable states for a control strategy according to the disturbance rejection model.
Figure 15:
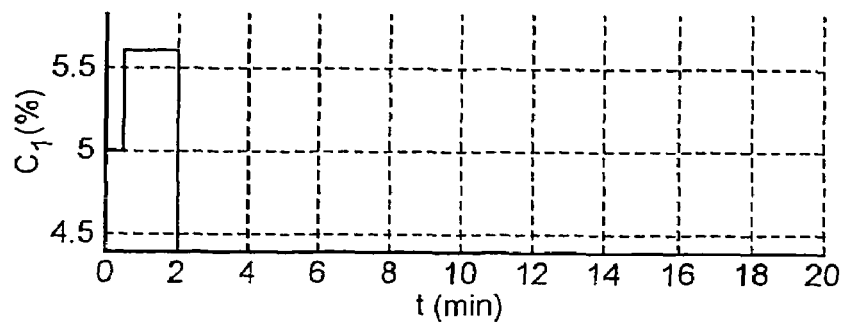
FIG. 15 shows the time profile of the measurable states for a control strategy according to the disturbance rejection model.
Figure 16A:
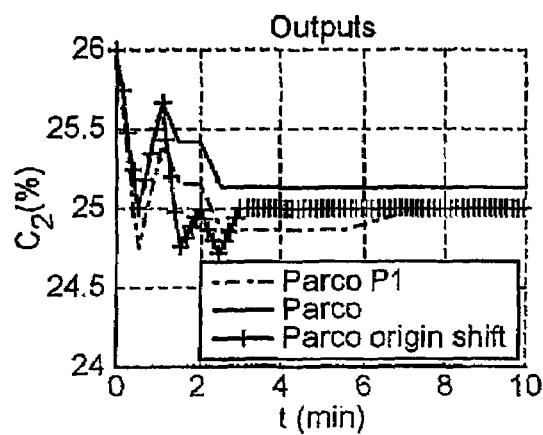
FIG. 16a shows the trajectory followed in state space for the control variables according to the disturbance rejection model.
Figure 16B:
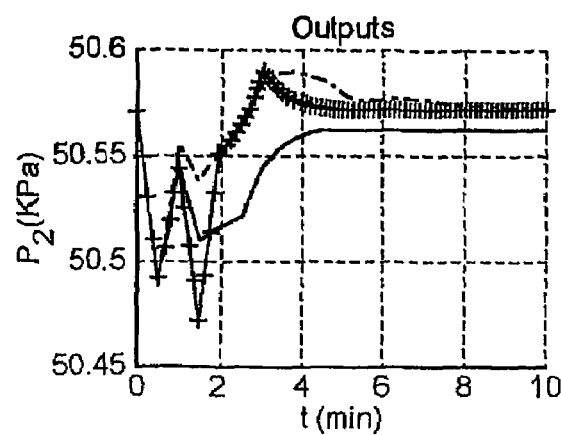
FIG. 16b shows the trajectory followed in state space for the control variables according to the disturbance rejection model.
Figure 17A:
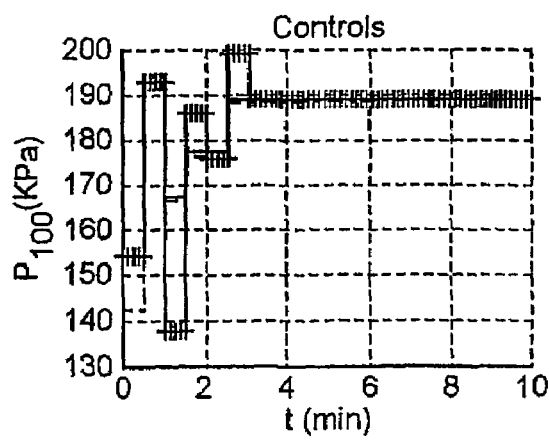
FIG. 17a shows the trajectory followed for the control variables according to the disturbance rejection model.
Figure 17B:
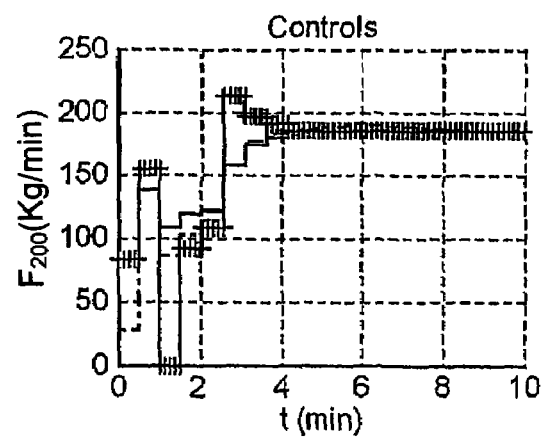
FIG. 17b shows the trajectory followed for the control variables according to the disturbance rejection model.

For testing the capabilities of this controller in presence of disturbances, a sequence of step disturbances is considered in $F_1$ and $C_1$ as shown in FIGS. 14 and 15. The system start operating from the slightly perturbed point $C_2$=26% and $P_2$=50.57 Kpa. The resulting optimum profiles of the inputs (controls) and the outputs are illustrated in FIGS. 16 and 17. The solid lines correspond to the response from the plain parametric controller, whereas the dashed line profiles result from the parametric PI controller. Similarly the dotted solid line represents the profiles from the original parametric controller with origin readjustment. The plain parametric controller exhibits a non-zero offset of the output profiles from the target point. Elimination of these permanent deviations is achieved both via the parametric PI controller and the parametric controller featuring origin readjustment.

As an example of the PI Parametric Controller, Control Law for region CR20 is given by Control Law:

$[P_{100}\ F_{200}]^T = a_{20} * [C_2\ P_2\ C_2^q\ P_2^q]^T + b_{20};$
$a_{20} = [$
    −5.4689e+01    4.3265e−01    −1.5494e+01    −6.3391e−01
    −1.8509e+02    8.5266e+02    −4.4574e+01    1.3552e+02];
$b_{20} = [$
    1.5387e+03
    −3.8258e+04];

Region Boundaries:

$CR^a_{20} * [C_2\ P_2\ C_2^q\ P_2^q]^T \leq CR^b_{20}$
$CR^a_{20} = [$
    2.0000e−01    0    0    0
    −8.3048e−01    3.8258e+00    −2.0000e−01    6.0808e−01

1.1959e+01    −9.4607e−02    3.3880e+00    1.3862e−01
    8.3048e−01    −3.8258e+00    2.0000e−01    −6.0808e−01
    0    0    0    9.4607e−02
    0    0    −2.0000e−01    0
    3.7251e+00    4.6286e−01    3.8040e+00    9.4607e−02
    −2.0000e−01    0    0    0
    0    0    0    −9.4607e−02
    −3.7251e+00    −4.6286e−01    −3.8040e+00    −9.4607e−02
    −1.1959e+01    9.4607e−02    −3.3880e+00    −1.3862e−01];
$CR^b_{20} = [$
    6.0000e+00
    1.7346e+02
    3.3649e+02
    −1.7166e+02
    3.0000e+00
    3.0000e+00
    1.1920e+02
    −4.9500e+00
    3.0000e+00
    −6.2876e+01
    −2.4903e+02];

The discussions above relate to solving problems where time is discretised into a finite set of discrete time intervals, in each time interval the control variable being represented by a polynomial. However other problem-types can also be solved and discussed below is a multi parametric-dynamic optimisation (mp-DO) problem where time is not discretised and control variables are obtained as a function of the state variables as well as time in the continuous time-domain. Moving away from a discrete time methodology allows the avoidance of inaccuracies if the sampling interval is not sufficiently small, and potential increases in the computational load. In the formulation of the control problem as an mp-DO problem the vector of time current states is considered as the parameters and the control variables as the optimisation variables. The solution of this problem provides a set of explicit functions of the control variables in terms of the state variables, and the We start by reviewing the problem to be solved. The control law can be derived from solving the following open-loop optimisation problem, over a receding horizon every time information about the current state x(t*) is available:

$$\hat{\phi} = \min_{\upsilon} \int_{t^*}^{t_f} \left[ \frac{1}{2} y(t)^T Q y(t) + \upsilon(t)^T R \upsilon(t) \right] dt + x(t_f)^T P x(t_f) \quad (1a)$$

$$\text{s.t. } \dot{x}(t) = A_1 x(t) + A_2 \upsilon(t) \quad (2a)$$

$$y(t) = B_1 x(t) \quad (3a)$$

$$x(t^*) = x^* \quad (4a)$$

$$b \geq C_1 x(t^+) + C_2 \upsilon(t^+), \quad (5a)$$

where $t+\in[\alpha, \beta] \subseteq \lfloor t^*, t_f \rfloor$ and $t \in \lfloor t^*, t_f \rfloor$; $x \in X \subseteq \Re^n$ are the states, such as concentration of components, mass, energy or momentum and $y \in \Re^m$ are the outputs, e.g. temperature, velocity, mole fraction; $\upsilon \in U \subseteq \Re^q$ are the control manipulating inputs, such as flows of streams, or power supply. Matrices $A_{1,2}$, $B_{1,2}$, $C_{1,2}$ are time-invariant and have dimensions n×n, n×q, m×n, s×n, s×q, b is a time-invariant vector of dimension q×1. The pair (A1, A2) is assumed to be stabilisable and the pair ($A_1$, $B_1$) detectable. s is the number of constraints for example pertaining to product specifications, or safety and environmental restrictions and lower and upper bounds on x and θ. Matrices Q, P>0, R>0 constitute the quadratic performance index. The terminal quadratic cost P is calculated according to stability criteria, from the solution of the steady state Riccati equation or the continuous Lyapunov equation.

These last equations are disclosed in more detail in Chen, H. and F. Allgower (1998). A Quasi-Infinite Horizon Nonlinear Model Predictive Control Scheme with Guaranteed Stability. *Automatica* 34(10), 1205-1217 and Scokaert, P. O. M. and J. B. Rawlings (1998). Constrained Linear Quadratic Regulation. *IEEE Trans. Aut. Cont.* 43(8) 1163-1169.

Applying parametric optimisation to the above problem reduces the on-line computational burden as discussed in detail above.

By treating the inception point of the system x* as a set of parameters, problem (1a)-(5a) is transformed to a multiparametric dynamic optimisation (mp-DO) problem. The approach proposed here is to modify the infinite dimensional mp-DO problem to an approximately equivalent finite dimensional multiparametric program, solvable with the current methods. This conceptual strategy requires the elimination of the state variables that cause the infinite dimensionality of the problem. A way to do that is to solve the differential equations (1a)-(2a) and obtain the explicit mapping x(u(t), x*(t)) $\mathfrak{R}^q \times \mathfrak{R}^n \to \mathfrak{R}^n$. This solution is given by:

$$x(t, \upsilon, x^*) = e^{A_1(t-t^*)}x^* + e^{A_1 t}\int_{t^*}^{t} e^{-A_1 t} A_2 \upsilon(t)\, dt \qquad (6a)$$

Then, the controls are parameterised using a set of time-variant optimisation variables. The most common form of control parameterisation is to assume a piecewise polynomial function for each control variable over a finite number of time elements. For convenience low order Lagrange polynomials are employed. Thus, over the element i in time the $j^{th}$ control variable is written as:

$$\upsilon_j = \sum_{l=1}^{M_{j+2}} u_{lji}\psi_l \quad j = 1, \ldots, m; \qquad (7)$$

$$\psi_l^{(M)}(t) = 1;\ \text{if}\ M = 0$$

$$\psi\varphi_l^{(M)}(t) = \prod_{i=1, j\neq 1}^{M} \frac{t-t_i}{t_l - t_i}\ \text{if}\ M \geq 1$$

Equation (7a) holds for $t \in [t_{l-1}, t_l]$; M is the order of the polynomial approximations and index i=1, ... $N_q$ runs over all the control elements; $u_{lji}$ are the time invariant variables to be determined by the solution of the optimisation problem. Expression (7a) is substituted in (6a) yielding the linear dependence of the states on the set of time invariant control elements. However, the constraints of the optimisation, that in general hold over the complete time horizon, remain infinite dimensional, resulting in general in a semi-infinite dimensional parametric optimisation problem (Hettich and Kortanek, 1993).

I Initialise a finite number of interior point constraints at times $t^* \in T^k$, where k denotes the number of iterations. The constraints are imposed only on these points. For this fixed set the parametric optimisation problem, (1a)-(5a) is transformed to a finite dimensional multiparametric quadratic program (mp-QP):

$$\hat{\phi}(x^*) = \min_{\upsilon^N} \frac{1}{2}\left[(\upsilon^N)^T L_1 \upsilon^N + (x^*)^T L_2(\upsilon^N) + (x^*)^T L_3 x^*\right] \qquad (8a)$$

$$s.t.\ 0 \geq G_1 \upsilon^N + G_2 x^* + G_3$$

where $L_{(\ )}$ and $G_{(\ )}$ are functions of the original problem matrices A, B, C, Q, R and $\upsilon^N$ is the control sequence vector consisting of all the time invariant control elements.

II Solve the parametric optimisation problem (mp-QP) for this particular set of interior constraints. The parametric solution provides a set of piecewise affine expressions for the manipulated inputs in terms of the states that hold over a set of critical state-space regions.

III Now, based on the parametric solution, test whether the same constraints are satisfied $\forall t^+ \in [\alpha, \beta]$ and $\forall x \in X$.

IV If some of the constraints are violated at particular points $t^{k*} \in T^{k*}$ then augment these points into Step I, i.e. $T1=\{T^k \cup T^{k*}\}$, then set k=k+1 and continue until the constraints are satisfied $\forall t \in [\alpha, \beta]$.

In Annex B it is proved that the decomposition method (I-IV) ensures convergence and optimality. The explicit control law for the system (1a)-(5a) is derived from the solution of the last mp-QP in Step II. The mathematical description of this control law is:

$$\upsilon_c^N(x^*) = a_c \cdot x^* + b_c;\ CR_c^1 \cdot x^* + CR_c^2 \leq 0$$

$$\text{for } c=1, \ldots N_c \qquad (9a)$$

where $N_c$ is the number of regions in the state space. The boundaries of the regions are defined from the inequality in (9a). Matrices $a_c$, $CR_c^1$ and vectors $b_c$, $CR_c^2$ are determined from the solution of the parametric programming problem (8a) and the index c designates that each region admits a different function for the manipulated inputs.

The solution of the multiparametric dynamic optimisation (mp-DO) problems (1a)-(5a) in the presence of only state constraints ($C_2$=null matrix) can be approached alternatively, by applying sensitivity analysis (Fiacco and Ishizuka, 1990) to the stationary conditions of the embedded dynamic optimisation problem. The Karish-Kuhn-Tucker optimality conditions for the optimal control problem (1)-(5) for fixed parameters x* and a fixed set of interior point constraints $C_1 \cdot x(t_k) \leq 0$ are (Malanowski and Maurer, 2001):

$$\hat{\lambda} = -Q_c \cdot x - A_1^t \cdot \lambda \qquad (10a)$$

$$\upsilon = -R^{-1} \cdot A_2^T \cdot \lambda \qquad (11a)$$

$$\lambda(t_k^-) = \lambda(t_k^+) + C_1^T \cdot \upsilon_k \qquad (12a)$$

$$\lambda(t_f) = P \cdot x(t_f) \qquad (13a)$$

$$0 = \upsilon_k \widehat{(x)}\ (C_1 \cdot x(t_k) - b);\ \upsilon_k \geq 0$$

$$k=1, \ldots N_R$$

Where $Q_c = B_1^T \cdot Q \cdot B_1 \qquad (14a)$ where $\lambda \in \mathfrak{R}^n$ is the vector of adjoint (co-state) time-varying variables associated with the dynamic ordinary differential system (ODE); $v_k \in \Re^s$ is the set of lagrange multipliers associated with the interior point constraints; k is the index running over all interior points where the constraints apply; symbol $\otimes$ denotes element by element multiplication. Equations (10a)-(13a) are the augmented Euler-Lagrange equations applying for the constraint case, whereas (14a) involves the complementarity conditions implying that when a constraint is inactive $\tilde{v}=0$, whereas for active constraints $\tilde{v} \geq 0$.

The solution of the multiple-point boundary value problem (10a)-(13a) is uniquely determined from the evaluation of the set of (i) the adjoint variables at the inception point $\lambda(t^*)=\lambda_o$, (ii) the lagrange multipliers $v_k$ and (iii) the state variables at the final point $x(t_f)=x_f$. Thus, the derivation of expressions for the optimal finite set $\xi=\{\lambda_o, v_k, x_f\}$ as a function of the state variables leads explicitly to the optimal control profile in terms of the state variables $v(x^*, t)$. For this purpose the transition matrix technique is employed here (Bryson and Ho, 1975), where first a joint ordinary differential system is constructed containing both the adjoint and the state equations:

$$\begin{bmatrix} \dot{x} \\ \dot{\lambda}(t) \end{bmatrix} = \underbrace{\begin{bmatrix} A_1 & -A_2 R^{-1} A_2^T \\ -Q_c & -A_1^T \end{bmatrix}}_{G} \cdot \begin{bmatrix} x(t) \\ \lambda(t) \end{bmatrix} \quad (15a)$$

Define Transition matrices: (16a)

$$Matk^{ij} = e^{G(t_i - t_j)} \quad (17a)$$
$$Matk^{fo} = e^{G(t_f - t^*)}$$
$$Matk^{io} = e^{G(t_i - t^*)}$$
$$Matk^{ij} = \begin{bmatrix} Matk_{11}^{ij} & Matk_{12}^{ij} \\ Matk_{21}^{ij} & Matk_{22}^{ij} \end{bmatrix}$$

where matrix $Matk_{11}^{ij}$, consists of the (1:n) x (1:n) elements of matrix $Matk^{ij}$. Matrices $Matk_{12}^{ij}$, $Matk_{21}^{ij}$, $Matk_{22}^{ij}$ are defined similarly. Following that notation, the sufficient optimality conditions with respect to the set $\xi=\{\lambda_o, v_k, x_f\}$ are recast as shown in Table 1a. Matrix I in Table 1a denotes the identity matrix of dimensions nxn. Next, Theorem 3.1 enables the derivation of the control functions $v(t, x^*)$ in terms of the current state conditions $x^*$.

TABLE 1a $$\underbrace{\begin{bmatrix} I - Matk_{12}^{fo} \\ P - Matk_{22}^{fo} \end{bmatrix}}_{H} \cdot \begin{bmatrix} x_f \\ \lambda_o \end{bmatrix} + \underbrace{\begin{bmatrix} Matk_{12}^{f1} Matk_{12}^{f2} \cdots \\ Matk_{22}^{f2} Matk_{22}^{f2} \cdots \end{bmatrix}}_{J} \cdot \begin{bmatrix} v_1 \\ v_2 \\ \vdots \end{bmatrix} = \underbrace{\begin{bmatrix} Matk_{11}^{fo} \\ Matk_{21}^{fo} \end{bmatrix}}_{S} \cdot x^* \quad (18a)$$

$$v \otimes \left\{ \underbrace{\begin{bmatrix} 0 & 0 & 0 & \cdot \\ -C_1 Matk_{12}^{21} \cdot C_1^T & 0 & 0 & \cdot \\ -C_1 Matk^{32} \cdot C_1^T & -C_1 Matk^{31} \cdot C_1^T & 0 & \cdot \\ \vdots & \vdots & & \end{bmatrix}}_{U} \cdot \begin{bmatrix} v_1 \\ v_2 \\ \vdots \end{bmatrix} + \right. \quad (19a)$$

TABLE 1a-continued $$\underbrace{\begin{bmatrix} 0 & C_1 \cdot Matk_{12}^{1o} \\ 0 & C_1 \cdot Matk_{12}^{2o} \\ 0 & C_1 \cdot Matk_{12}^{3o} \\ \vdots & \vdots \end{bmatrix}}_{M} \cdot \begin{bmatrix} x_f \\ \lambda_o \end{bmatrix} - \underbrace{\begin{bmatrix} -C_1 \cdot Matk_{11}^{1o} \\ -C_1 \cdot Matk_{11}^{2o} \\ -C_1 \cdot Matk_{11}^{3o} \\ \vdots \end{bmatrix}}_{F} \cdot x^* - \underbrace{\begin{bmatrix} b \\ b \\ b \\ \vdots \end{bmatrix}}_{B} \right\} = 0$$

Theorem 3.1 Let $Q_c$, P be positive semi-definite matrices and R be a positive definite matrix. Let also the complementarity slackness condition i.e. $\tilde{v}>0$, and the linear independence condition of the binding constraints hold. Then $x_f$, $\lambda_o$ and v are affine functions of $x^*$.

Proof: From equation (18a) of the first order KKT optimality conditions Table 1a) we have:

$$\begin{bmatrix} x_f \\ \lambda_o \end{bmatrix} = -H^{-1} \cdot J \cdot [v_x] + H^{-1} \cdot S \cdot x^* \quad (21a)$$

Then for the active constraints, equation (19a) yields:

$$\tilde{M} \cdot \begin{bmatrix} x_f \\ \lambda_o \end{bmatrix} + \tilde{U} \cdot [\tilde{v}_k] - \tilde{F} \cdot x^* - \tilde{B} = 0 \quad (22a)$$

where $\tilde{M}$, $\tilde{U}$, $\tilde{F}$, $\tilde{B}$ are the matrices consisting of the rows of M, U, F, B respectively, that correspond to active constraints. Substituting (21a) into (22a) we obtain:

$$0 = \quad (23a)$$
$$-\tilde{M} \cdot [-H^{-1} \cdot \tilde{J} \cdot [v_k] + H^{-1} \cdot S \cdot x^*] + \tilde{U} \cdot [v_k] - \tilde{F} \cdot x^* - \tilde{B} \Leftrightarrow [\tilde{v}_k] =$$
$$[\tilde{M} \cdot H^{-1} \cdot \tilde{J} + \tilde{U}]^{-1} \cdot [\tilde{M} \cdot H^{-1} \cdot S + \tilde{F}] \cdot x^* +$$
$$[\tilde{M} \cdot H^{-1} \cdot \tilde{J} + \tilde{U}]^{-1} \cdot \tilde{B}$$

Note that submatrix $\tilde{J}$ pertains to the active constraints and also that $[\tilde{M} \cdot H^{-1} \cdot \tilde{J} + \tilde{U}]^{-1}$ exists because of the assumption that the active constraints are linearly independent. From (23a) it follows that the multipliers $\tilde{v}$ corresponding to the active constraints are an affine function of the current states $x^*$. Hence, once (23a) is substituted to (21a) along with the condition $\tilde{v}=0$, an affine expression of $[x_f \lambda_o]^T$ in terms of $x^*$ is derived.

The affine expressions for $\xi(x^*)$ hold over a particular critical region CR in the state-space where the set of active constraints remains unaltered. Hence, it can be proved via the solution of the dynamic system (15a), the jump conditions (12a) (Bryson and Ho, 1975) and equation (11a) that (i) the control law $v(x^*, t)$ is a continuous piecewise linear function in terms of $x^*$ and (ii) $\hat{\Phi}(x^*)$ is a continuous, convex and piecewise quadratic function.

The identification of the critical regions (CR) in the state space where the affine control expressions hold is performed via the feasibility and optimality conditions. Feasibility is ensured by substituting $\xi(x^*)$ into the inactive inequality set encapsulated in (19a) and forcing it to be less than zero, whereas optimality is represented by $\tilde{v}(x^*) \geq 0$. This set of state inequalities define the state boundaries of each one of the critical regions:

$$CR_{\tilde{c}} = \left\{ \breve{M} \cdot \begin{bmatrix} x_f \\ \lambda_o \end{bmatrix} + \breve{U} \cdot [v_k] - \breve{F} \cdot x^* - \breve{B} \leq 0, \tilde{v} \geq 0 \right\} \cap CR^{IG} \quad (24a)$$

where $CR^{IG}$ is the initially specified state-space region. From the state inequalities the redundant ones are removed and a compact representation of the region $CR_c$ is derived. The construction of the complete mapping of the control variables to the space of the current states is summarised below:

1. Define an initial region $CR^{IG}$. Set index c=1.
2. Fix $x^*_c$ at a feasible point within the region $CR^{IG}$ and solve the dynamic optimization problem via an active set strategy.
3. Compute matrices H, $\mathcal{J}$, S, M, $\tilde{U}$, $\mathcal{F}$ and B and obtain linear expressions for $x_f$, $\lambda_o$v in terms of x*. Next, solve the ODE (15a), symbolically with respect to its initial conditions to determine $\lambda(t, x^*)$, $x(t, x^*)$. Then obtain the control law $v_o(t, x^*)$ via (11a).
4. Construct the region boundaries from (24a) and remove the redundant inequalities resulting in a compact region $CR_c$ associated with point $x^*_c$ and control law $v_c(t, x^*)$.
5. Define the rest of the region as $$CR^{rest} = CR^{JG} - \bigcup_C CR_v.$$

6. If no more regions to explore, go to next step, otherwise set $CR^{IG} = CR^{rest}$ and c=c+1 and go to step 2.
7. Collect all the solutions and unify the regions having the same solution to obtain a compact representation. Thus a piecewise affine time dependent control law is derived of the following form:

$$v_c(t, x^*) = a_c(t) \cdot x^* + b_c(t); \quad CR_c^1 \cdot x^* + CR_c^2 \leq 0;$$

$$\text{for } c=1, \ldots N_c \quad (25a)$$

where $a_c$, $b_c$ are time dependent matrices and vectors. Note that the control law derivation was conducted provided that only interior point constraints are imposed. The more general case of path constraints that hold over the complete horizon or over continuous intervals within the time domain, is treated via the two-stage decomposition approach in section (3.1) that in that case guarantees feasibility within a tolerance $\epsilon > 0$.

The proposed solution procedure does not require any appriori discretisation of the controls, therefore, the length of the measurement sampling interval is independent of the optimal control expressions.

A simple numerical example is presented to demonstrate the features of the newly developed parametric controller for continuous systems. Here, only the method based on calculus of variations will be demonstrated because of space limitation reasons. Consider a SISO plant control example corresponding to the following numerical values of the problem matrices (1a)-(5a):

$$A_1 = \begin{bmatrix} 1.6313 & -0.6313 \\ 1 & 0 \end{bmatrix} ]A_2 = \begin{bmatrix} 1 \\ 0 \end{bmatrix} \quad A_2 = \begin{bmatrix} 1 \\ 0 \end{bmatrix}$$

$$B_1 = [0.0034 \ 0.0029]; \quad C_1 = [1.5 \ 1]$$

$$0 \geq C_1 \cdot x(t) \forall t \in [0.01, t_f]; \quad Q = 10^3, \quad R = 10^{-4}$$

Figure 18:
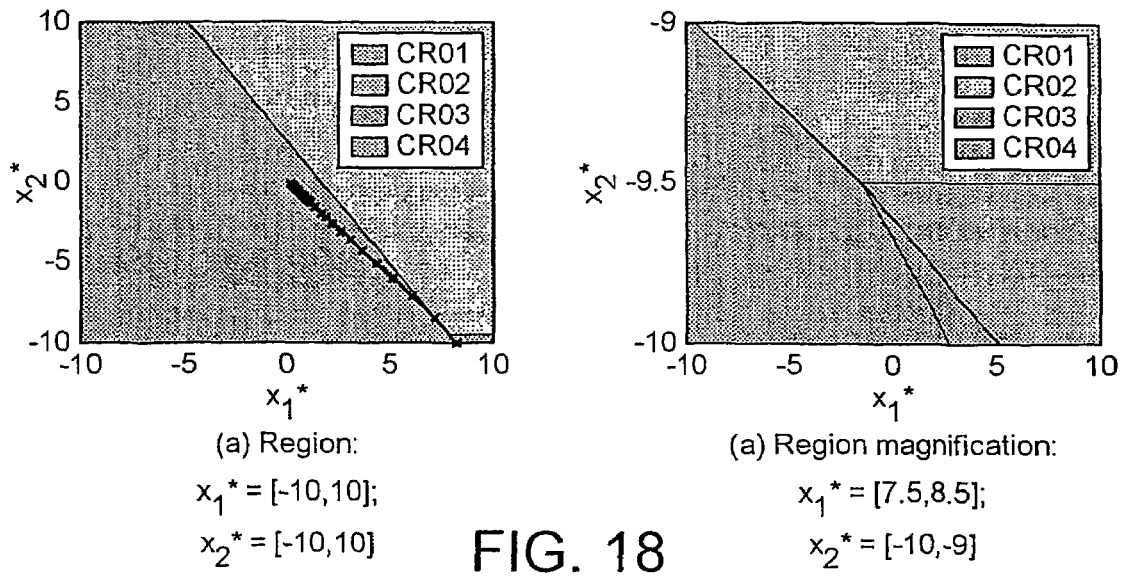
FIG. 18 shows the critical region partition for further embodiment.

The time horizon is calculated based on the invariant act formed by the constraints, and its value is $t_f = 1.5$ sec. The terminal cost P is evaluated from the solution of the Riccati equation. By solving the multiparametric dynamic optimisation program (1a)-(5a) considering the current conditions x* as parameters we obtain the optimal piecewise affine control law for the system. Constraint feasibility over the pre-specified time interval $[0.01, t_f]$ is assured within a 0.8% tolerance via imposing the constraints at the critical time instants: $t_1^k = 0.01$ sec and $t_2^k = 0.075$ sec. This explicit control scheme is partitioned to polyhedral critical regions of the state-space, each one featuring a particular control-state expression. A snapshot of the entire state-space is shown in FIG. 18. For example in the region $CR_{01}$ defined by the state inequalities: $-x^*_1 - 2 \cdot 10^2 x^*_2 - 1891.1 \geq 0$; $x^*_1 \leq 10$; $1.5183 x^*_1 + x^*_2 - 2.53 \geq 0$; $x^*_2 \geq -10$ the control law is determined by the expression:

$$v = -9.16e^{10.773t}(3.58x_1^* + 2.91x_2^*) +$$
$$12.41e^{-10.77t}(-6.03x_1^* - 3.32x_2^*) - 0.025e^{0.857t}(0.14x_1^* + 0.066x_2^*) +$$
$$2.1e^{-0.86t}(2.35x_1^* + 0.69x_2^*) + 64.57e^{10.77t} + 98.41e^{-10.77t} +$$
$$0.0058e^{0.857t} - 3.33e^{-0.857t} - 3.33e^{-0.857t}; \forall t \in [0,0.01]$$

Figure 19:
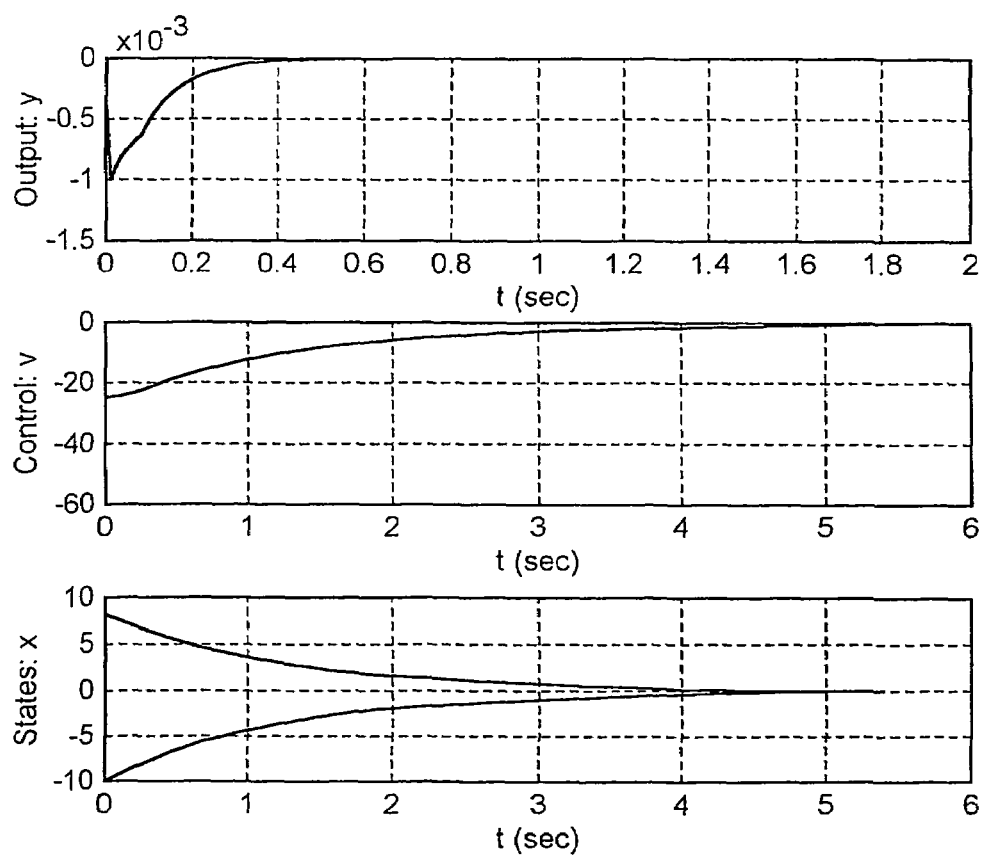
FIG. 19 shows the output, control and state profile for the embodiment of FIG. 18.

Similar expressions are obtained for $t \in [0.01, 0.0751]$, $t \in [0.075, 1.5]$ FIG. 18 also shows the state-space trajectory followed when the system is driven to the origin undisturbed from an initially perturbed point $x_o = [10, -8.5]$. The output, control and state time profiles for the aforementioned perturbed point are shown in FIG. 19. Since the control remains unconstrained the set of the admissible initial points coincide with the complete state space.

The Fiacco and Ishizuka reference is Fiacco, A. V. and Y. Ishizuka (1990). Sensitivity and Stability analysis for nonlinear programming. *Annals of Oper. Res.* 27, 215-237 and the Bryson and Ho reference is Bryson, A. E. and Y. Ho (1975). *Appl. Opt. Cont*. The Hettich & Kortanek reference is (1993) Semi-infinite Programming: Theory, Methods & Applications, Siam Review 35(3), 380-429. The Malanowski Maurer reference is (2001) Sensitivity Analysis for Optimal Control Problems subject to Higher Order State Constraints Ann. Op. Res. 101, 43-73.

As a result an exact solution of problem is obtained since time is not discretised and no hypothesis is made about the polynomial nature of the control variables. However it should be born in mind in the particular methodology applied, constraints on control variables are not considered as it is assumed that matrix $C_2$ in equation (5) contains only zero elements and that constraints on state variables exist at certain discrete times, not continuously for complete time intervals. It will be appreciated, however, that using appropriate mathematical techniques these limitations can be avoided.

An alternative way of compensating for disturbance is now discussed. As evident from the above treatment, if one assumes that there are no disturbances in the model and derives the explicit controller, and then tries to implement it on a real system which includes disturbances then there may be constraint violations and hence infeasible operation. In overview, the approach set out in the following discussion solves this problem by finding the value of the disturbance that could result in the worst-case violation of the constraints and then deriving the explicit controller for a problem including this disturbance. It can be shown that if the system is feasible for the worst-case then it will be feasible for any value of the disturbance. An advantage of this approach is that on-line adjustment of the control solution to correct the disturbance estimate is not required. As a result a global if somewhat less optimised control solution is obtained, but this is mitigated by a reduction in the on-line computational burden, bearing in mind that the disturbance is no longer a co-ordinate of the solution space. In the following discussion disturbance attenuation is achieved for the case both of slowly varying disturbances and for bounded uncertainties by including in the parametric controller design, an explicit feasibility constraint that ensures feasible operation for all possible uncertain parameter realisations. It will be appreciated that the approach can be extended to other types of disturbances and problem-types using appropriate mathematical methodology.

Reverting to equation (17) the controller is asymptotically stable, thus it guarantees no steady state offset from the target point in the presence of constant disturbances $\theta \in \Theta \subset \Re^w$, where $\Theta \equiv \theta^L \leq \theta \leq \theta^U$ on condition that (i) the dimension of the controls is larger or equal to the output dimension $q \geq m$ (ii) the open-loop transfer matrix defined from the equation: $H(z) = B1(zI-A1)^{-1}A2+B2$ posseses no zeros at the origin, (iii) the quadratic cost matrix $Q_1$ that penalises the integral error is positive-definite (iv) the terminal cost and the time horizon length are appropriately tuned to guarantee stability in the absence of disturbances (Rawlings and Muske, 1993) and (v) the reference point of attraction is an interior point of the feasible region space defined as: $\hat{y} \in Y, Y = \{y \in \Re^m \cup y_{t|k} = B_{t|k} + B_2 v_{t|k}, x_{t|k+1} = A_1 x_{t|k} + A_2 v_{t|k} + W\theta_{t|k}, g(x_{t|k}, v_{t|k}) \leq 0, v \in V, \theta \in \Theta, k=1, \ldots N\}$.

Due to space limitations the theorem is proved here only for the case where the output trajectory $y_{t|k}$ lies in a critical region where none of the constraints g is active $\hat{x} \in R$. Consider for simplicity $B_2 = 0$, the proof is valid for $B_2 \neq 0$ with minor modifications. Since the target point lies in the unconstrained region, according to condition (iv) the control brings the plant into an invariant set within this region. The control law for the unconstraint case can be proved to be of the form $v = -F_1 \cdot x - F2 \cdot xq$. If we substitute this law into the plant $\{y_k = B_1 x_k + B_2 v_k, x_{k+1} = A_1 x_k + A_2 v_k + W\theta_k\}$ and take the z-transform of the dynamic system we will eventually obtain:

$$(z-1)y(z) = B_1(zI - A_1 + A_2 F_1)^{-1} \cdot \{-A_2 F_2 y(z) + (z-1)\theta(z)\} \quad (5b)$$

Note that the inverse of $(zI-A_1+A_2F_1)$ exists due to conditions (ii), (iv) and the fact that the plant $(A_1, A_2)$ is stabilised, At the limit $t \to \infty$, $z \to 1$. Hence (5b) reduces to: $-BF_2 y(1)=0$. Note that $F_2$ is a linear function of the integral cost (Dua et al,. 2001), so its rows are linear dependent due to condition (iii). This implies that $y(1)=0$, ie. $\lim y_k \to \infty = 0$.

The main advantage of the parametric PI controller (17) is that it does not necessitate the existence of a disturbance or uncertainty estimator since this is taken into consideration implicitly via integral action. If the target point does not belong to the feasible region $\hat{y} \neq 0 \in Y$ then the equilibrium point $\hat{y} \neq 0$ in terms of the control driven outputs will lie on the boundaries of the feasible region. Then Theorem 2.1 still holds provided that for the evaluation of the integral states, the error of the outputs is shifted according to the modified equilibrium point, i.e.

$$xqk + 1 = xqk + \underbrace{(yk - \hat{y}k)}_{error}.$$

The parametric PI controller (17) despite ensuring asymptotically offset elimination, does not guarantee feasibility during the dynamic process operation in the presence of time-varying uncertainty. The traditional techniques for designing a robust model-based controller thus, avoiding this shortcoming, rely on either minimising on-line the worse case cost (e.g. Campo and Morari, 1987) or incorporating a set of robustness constraints (eg Badgwell, 1997). The former methods are often computationally prohibitive due to the numerous uncertainty combinations that have to be examined and may lead to a conservative control action since the worst-case objective is penalised. Furthermore, the incorporation of robustness constraints may lead to unfavourable non-convexities. Recently, Bemporad et al., (2001) based on the work of Pistikopoulos et al., (2000) and Bemporad et al., (2002) developed a technique for moving the computations off-line, but their approach merely minimises the worse case $\infty$—norm of the output/input deviations that may cause dead-beat or conservative control.

In this work, feasibility analysis theory (Grossmann et al., 1983) is utilised for deriving the robust parametric controller in a similar fashion to the multiperiod approach Kakalis et al., (2001); However, here, a more compact optimisation problem is formulated that surpasses in terms of constraint satisfaction. The system is considered to be perturbed by a vector of unknown input affine time-varying uncertainties $\theta$ that are assumed to belong to a compact polyhedral set $\theta \in \Theta \subset R^w$. The robust controller can be defined as the controller that provides a single control sequence that steers the plant into the feasible operating region for all the possible uncertainty realisations. The design of such a control scheme is obtained by solving a receding horizon optimal control problem by minimising the expected or the nominal value of the system output and input deviations over the entire uncertainty set subject to the operating constraints. The equality constraints that represent the dynamics and the state variables $x_{t|k}$ are eliminated for a more compact notation, to a set of solely linear inequalities:

$$[g_j(x_{t|k}, v_{t|k}) \leq 0 | x_{t|k+1} = x_{t|k} A_1 x_{t|k} + A_2 v_{t|k} + W\theta_{t|k},$$
$$x_{t|0} = x^*] \Leftrightarrow g_j(x^*, v_{t|k}, \theta_{t|k}) \leq 0$$

Optimisation over the single nominal uncertainty scenario results the following mathematical formulation:

$$\phi(x^*) = [Problem(3)]$$

$$\text{s.t. } \forall \theta \in \Theta (\forall j \in J | g_j(x^*, v_{t|k}, \theta_{t|k}) \leq 0; j=1, \ldots J; k=0, 1, 2, \ldots N; v_{t|k} \in V; \theta \in \Theta]) \quad (6b)$$

The constraint in (6) is denoted as the feasibility constraint since it ensures that the single control law derived from this problem satisfies all the constraints for all the possible bounded uncertainty scenarios. The feasibility constraint represents an infinite set of constraints since the inequalities are defined for every possible value of $\theta \in \Theta$. Hence, problem (6) is in general a semi-infinite program that is equivalent to the following bilevel program:

$$\phi(x^*) = [\text{Problem}(3)] \tag{7b}$$

$$\text{s.t. } 0 \geq \max_{\theta_{t|k}, j}\{g_j(x_{t|k}, v_{t|k}, \theta_{t|k}) j = 1, \ldots J;$$

$$k = 0, 1, 2, \ldots N; v_{t|k} \in V; \theta \in \Theta\} \tag{8b}$$

Problem (7b), (8b) is a bilevel program that has as constraints an embedded max max optimisation problem. The next steps will enable us to solve parametrically the embedded optimisation (8b) in terms of $v_{t|k}$, $x^*$ and replace it in (7b)-(8b) as a set of linear equations. This is done as follows:

1. Solve problem:

$$G_j(v_{t|k}, x^*) = \max_{\theta_{t|k}}\{g_j(x_{t|k}, v_{t|k}, \theta_{t|k}) \theta^L \leq \theta \leq \theta^u)\} \tag{9b}$$

$$j = 1, \ldots J.$$

as a parametric program by recasting the control elements and the current states as parameters. Note that each individual maximisation problem is not subject to any inequality constraints and hence, the maximisation is performed trivially via the method of Pistikopoulos and Grossmann (1988b):

(i) if $\dfrac{\partial g_j}{\partial \theta_{t|k}} > 0 \Rightarrow \theta_{t|k} = \theta^U$; $j = 1, \ldots J; k = 0, \ldots N-1$ and $G_j(v_{t|k}, x^*) = g_j(v_{t|k}, x^*, \theta^U).$ (i) if $\dfrac{\partial g_j}{\partial \theta_{t|k}} < 0 \Rightarrow \theta_{t|k} = \theta^L$; $j = 1, \ldots J; k = 0, \ldots N-1$ and $G_j(v_{t|k}, x^*) = g_j(v_{t|k}, x^*, \theta^L).$ 2. Then compare the parametric profiles $G_j(v_{t|k}, x^*)$ over the space of $v_{t|k}$ and $x^*$ and retain the upper bounds. For that purpose a multiparametric linear program is formulated and solved that is shown to be equivalent to the formal comparison procedure of Acevedo and Pistikopoulos (1999):

$$\psi(v_{t|k}, x^*) = \max_j G_j \Leftrightarrow \left\{\psi(v_{t|k}, x^*) = \min_\varepsilon \varepsilon\right\} \tag{10b}$$

$$\text{s.t. } E \geq G_j, j-1, \ldots J\}$$

3. The solution of problem (10b) consists of a set of linear expressions for $\Psi_i$, i=1, in terms of the parameters $v_{t|k}$ and $x^*$ and a set of region $\psi_i, \ldots \hat{N}_{reg}$ where these expressions are valid. Note that since no region $\Psi_i$ exists where $\psi_i \leq \psi_i$; $\forall i \neq \hat{i}$ the full set of expressions $\psi_i, i=1, \ldots N_{reg}$ can replace exactly the max max constraint in (8b).

The importance of expressing the underlying optimisation problem (8b) as a set of inequalities is that we can now write the overall problem (7b)-(8b) as a single-level program:

$$\phi(x^*) = \min_{v_{t|k}} \Phi(x_{t|k}, v_{t|k})$$

s.t. $x_{t|k+1} = A_1 x_{t|k} + A_2 v_{t|k} y_{t|k} = B_1 x_{t|k} + B_2 v_{t|k} 0 \geq g_j(x_{t|k}, v_{t|k}), 0 \geq \psi i(x^*, v_{t|k}) x_{t|0} = x^*, i-1, \ldots \hat{N}_{reg}, j=1, \ldots$
$J, k=0, 1, 2, \ldots N$ (11b)

Where $\Phi$ is the quadratic objective as in (13). By treating the current states only as parameters and the control variables as optimisation variables problem (11b) is recast as a parametric quadratic program. The solution of this problem Qua et al., 2001) provides the complete mapping of the control variables in terms of the current state. Thus, a control law in the form of (2), or (4) in the presence of integral states, is generated. Note that if the disturbances $\theta$ are not vanishing or zero this means the integral action is necessary for eliminating the steady state offset ensuring satisfactory disturbance rejection. Thus, the incorporation of the integral action in the robust controller framework is explicitly generating a robust parametric PI controller.

Problem (11b) is loaded with only $\hat{N}_{reg} \leq J$ feasibility constraints in addition to the constraints in (13). This is in addition to the constraints in (13). This is in contrast to the multiperiod approach where J constraints are included for each period. Note also that the maximum number of additional constraints is independent of the number of bounded uncertainties: w. Whereas in the approach of Campo and Morari (1987), $2^{2w}$ scenarios are examined giving rise to $2^{2w}$ J constraints that have to be incorporated.

An example is presented to demonstrate the features of this newly developed control design methodology. The problem is concerned with deriving the explicit robust control law for an evaporator process studied in Kookos and Perkins, 2001. The controlled outputs are the pressure $P_2$ and the concentration $C_2$ of the product stream that are also the states of the system. Their nominal reference values are: $\hat{P}_2$=50.57 KPa; $\hat{C}_2$=25%. The manipulating inputs are the pressure of the utility stream $P_{100}$ and the cooling water flow $F_{200}$. The active output constraint when operating around the nominal point is: $C_2 \leq 25\%$ whereas additional constraints are also imposed on the inputs. The feed flowrate $F_j$ and composition $C_j$ are considered as a disturbances.

Figure 20:
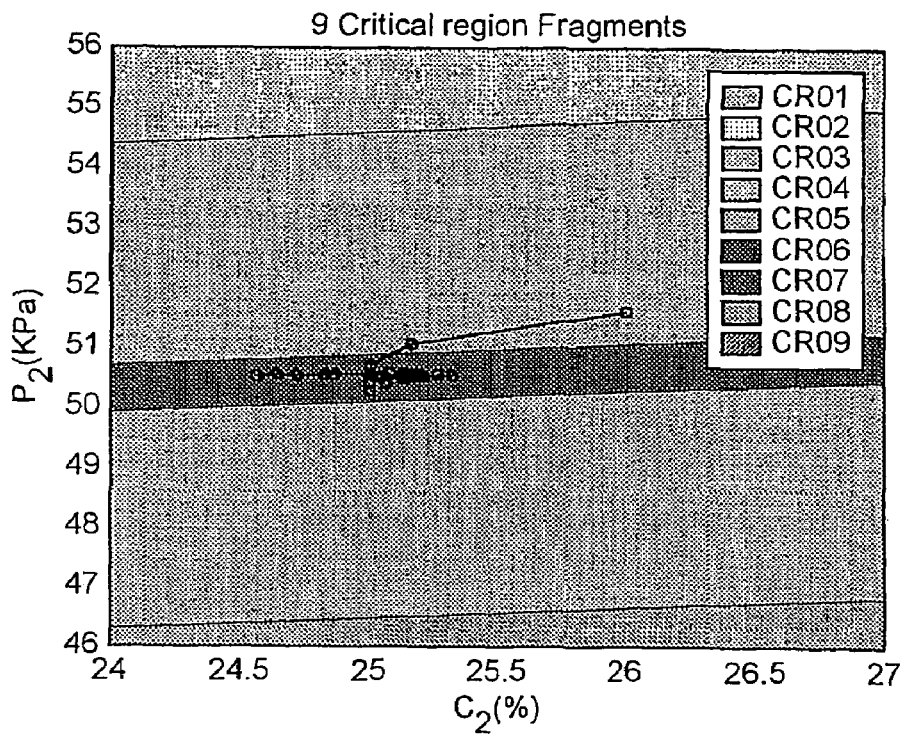
FIG. 20 shows the critical region partition for further embodiment.
Figure 21:
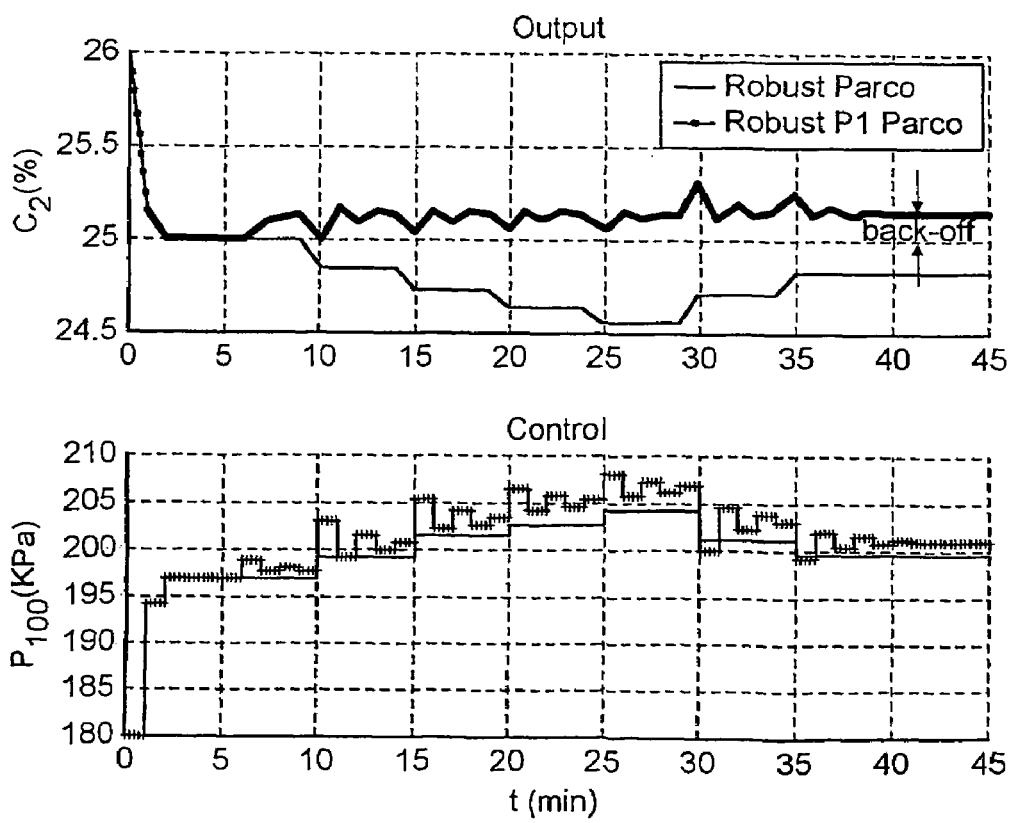
FIG. 21 shows the output and control profile for the embodiment of FIG. 20.

For deriving the robust control law, first the feasibility problem (8b) is considered with a horizon N=3, considering $F_i$ and $C_i$ as deterministic bounded uncertainties varying within 0.1 kg/min and 0.1% respectively. 12 feasibility functions $\psi(v_{t|k}, X^*)$ are derived. A model-based receding horizon optimal control problem of the form of (11b) is then formulated. By treating the current states as parameters the optimal control problem is recast as an mp-QP and its solution features a robust parametric controller (robust parco). The state space partition of this controller is shown in FIG. 1, where each region corresponds to a particular expression for the control actions. Since the constraint boundary coincides with the nominal reference target the model-based controller generates implicitly a back-off of $\Delta \hat{C}_2$=0.17% to accommodate the impact of the disturbances. For designing the robust PI parametric controller (robust PI parco) two additional integral states are introduced and the same procedure is pursued. In the PI parco the state space is partitioned to 37 regions each one corresponding to different control expressions. For instance in one of them the control law for $F_{200}$ is given by:

$F_{200} = -97.2C_2 + 675.9P_2 + 9.2 \cdot 10^{-3} Cq_2 + 145 Pq_2 - 3.15 \cdot 10^4.$ The execution of the control policies for both schemes are shown in FIG. 21 in the time domain, for one control and one output, and in FIG. 20 in the state space. The system is initially perturbed $C_{2,t=0}$=26%, $P_{2,t=0}$=51.57 KPa and as it is driven back to the origin a sequence of non-zero mean persistent step disturbances occur. The robust PI parco outperforms the plain robust parco since it manages to reject disturbances of magnitude $\Delta C_2 > 0.1\%$, $\Delta F_1 > 0.1$ KPa provided their frequency of variation is sufficiently low to allow for the integral action to be activated.

The references set out in the above passage are as follows:
1. Rawlings, J. B. and K. R. Muski (1993). The Stability of Constrained Receding Horizon Control. *IEEE Trans. Automatic Contro.* 38(10), 1512-1516.
2. Campo, P. J. and M. Morari (1987). Robust Model Predictive Control. In: *Proc. American Control Conference*. ACC. Minneapolis. pp. 1021-1026.
3. Badgwell, T. A. (1997). Robust model predictive control of stable linear systems. *Int. J. Contr.* 68(4), 797-818.
4. Bemporad, A., F. Borelli and M. Morari (2001). Robust Model Predictive Control: Piecewise Linear Explicit Solution. In: *European Control Conference*.
5. Pistikopoulos, E. N., V. Dua, N. A. Bozinis, A. Bemporad and M. Morari (2000). On-line optimization via off-line parametric optimization tools. *Comput. Chem. Eng.* 24(2-7), pp. 183-188.
6. Bemporad, A., M. Morari, V. Dua and E. N. Pistikopoulos (2002). The Explicit Linear Quadratic Regulator for Constrained Systems. *Automatica* 38(1), 3-20.
7. Grossmann, I. E., K. P. Halemane and R. E. Swaney (1983). Optimization Strategies for Flexible Chemical Processes. *Comput. Chem. Eng.* 7(4), 439-462.
8. Kakalis, N., V. Sakizlis, V. Dua, J. D. Perkins and E. N. Pistikopoulos (2001). A Parametric Optimization Approach for Robust MPC. accepted for publication in 15$^{th}$ IFAC World Congress on Automatic Control.
9. Pistikopoulos, E. N. and I. E. Grossmann (1988b). Optimal Retrofit Design for Improving Process Flexibility in Linear Systems. *Comput. Chem. Eng.* 12(7), 719-731.
10. Acevedo, J. and E. N. Pistikopoulos (1999). An algorithm for multiparametric mixed—integer linear programming problems. *Oper. Res. Letters* 24, 139-148.
11. Kookos, I. K. and J. D. Perkins (2002). An algorithmic method for the selection of multivariable process control structures. *J. of Proc. Control* 12(1), 85-99.

It will be seen that, by applying parametric optimisation the controller need only carry out simple substitution or function evaluation at each stage rather than complex optimisation calculations, the off-line optimisation stage allowing construction of a simple plot against state variables of a plurality of regions each representing a simple solution.

The parametric profile for a given plant, system or process as derived off-line from a model based control strategy such as MPC can then be embedded in software or hardware in an appropriate data store such as a chip, disk, a memory device or so forth. The solution can be embedded in the form of a simple look-up table against state variable values in relation to substition-type solutions (ie control variables constant in a given solution reason) and simple function-based algorithms in function evaluation regions or, evidently, as a combination of the two.

It will be appreciated that any form of process, plant or system capable of being modeled can have a control strategy constructed off-line, within the capabilities of parametric optimisation techniques currently available. However it will be further appreciated that as additional techniques are developed including the solution of the generalised problem at equation (4) above, the skilled person can apply these techniques equally based on the teachings of the present specification.

The techniques according to the invention can be applied to complex systems including any number of state and control variables, and the solution space being dimensioned accordingly. The measurement intervals and prediction horizon (ie the time period over which the state variable predictions are formulated) can be of any appropriate duration dependent only on the off-line processing capability available.

Although the specific description concerns the techniques of the present invention as applied to model predictive control, they can be applied equally to other control schemes including hybrid control in which MPC is extended to include mixed integer variables (i.e. both continuous variables and (0, 1) binary variables) planning under certainty, where performance criteria and an optimal process plan is obtained as a function of uncertain parameters and robustness analysis in model based control applications where robustness as a measure of the ability to absorb uncertainty or variations can be obtained as a function of the uncertainty. Other model based control applications can be optimised using the present invention including more conventional feedback based systems such as proportional integral (PI) systems and so forth.

ANNEX A $A =$ 1.0e+02*

| | |
|---|---|
| −0.00025500000000 | 0.00000001510000 |
| 2.27000000000000 | −0.00041000000000 |

$B =$

| | |
|---|---|
| 0.00000329000000 | −0.00002600000000 |
| −0.02800000000000 | 0.78000000000000 |

$D =$ 1.0e+03*

| | |
|---|---|
| −4.42000000000000 | 0.00053800000000 |
| 0 | 0 |
| 0 | 0 |

-continued

ANNEX A

| | |
|---|---|
| 0 | 0 |
| 0 | 0 |
| 0.00100000000000 | 0 |
| 0 | 0.00100000000000 |
| −0.00100000000000 | 0 |
| 0 | −0.00100000000000 |

$y_{max} =$ 1.0e+03*
1.00000000000000
0.40000000000000
0.06000000000000
0.10000000000000
0
0.00000624840000
1.00000000000000
0.00000416560000
0.90000000000000

H =

| | |
|---|---|
| 0 | 0.087700000000000 |
| 1.00000000000000 | 0 |
| 0 | 1.00000000000000 |
| −1.00000000000000 | 0 |
| 0 | −1.00000000000000 |
| 0 | 0 |
| 0 | 0 |
| 0 | 0 |
| 0 | 0 |

P1 =

1.0e+09*

| | |
|---|---|
| 0.0000 | 0.0002 |
| 0.0002 | 1.1027 |

Q1 =

| | |
|---|---|
| 2 | 0 |
| 0 | 2 |

R1 =

| | |
|---|---|
| 0.00200000000000 | 0 |
| 0 | 0.00200000000000 |

G1 =
Columns 1 through 4

| | | | |
|---|---|---|---|
| 4.12947660699848 | −8.13592179979736 | 4.36267124180270 | −9.12161686690865 |
| −4.12947660699848 | 8.13592179979736 | −4.36267124180270 | 9.12161686690865 |
| −0.89130915510123 | 8.40790937896969 | −0.99269981466792 | 9.03230674884973 |
| 0.89130915510123 | −8.40790937896969 | 0.99269981466792 | −9.03230674884973 |
| −2.99155234694732 | 16.29925226227316 | −3.24035562050785 | 17.65725013844254 |
| 4.88207341973133 | −11.36516561338645 | 0 | 0 |
| −4.88207341973133 | 11.36516561338645 | 0 | 0 |
| −1.22319512632872 | 10.43671459096085 | 0 | 0 |
| 1.22319512632872 | −10.43671459096085 | 0 | 0 |
| −3.80182000031313 | 44.30513241212174 | 0 | 0 |
| 4.61307393084638 | −10.19554165253652 | 4.88207341973133 | −11.36516561338645 |
| −4.61307393084638 | 10.19554165253652 | −4.88207341973133 | 11.36516561338645 |
| −1.10307547759355 | 9.70718411372772 | −1.22319512632872 | 10.43671459096085 |
| 1.10307547759355 | −9.70718411372772 | 1.22319512632872 | −10.43671459096085 |
| −3.50987002916867 | 19.12834006053316 | −3.80182000031313 | 44.30513241212174 |
| 4.36267124180270 | −9.12161686690865 | 4.61307393084638 | −10.19554165253652 |
| −4.36267124180270 | 9.12161686690865 | −4.61307393084638 | 10.19554165253652 |
| −0.99269981466792 | 9.03230674884973 | −1.10307547759355 | 9.70718411372772 |
| 0.99269981466792 | −9.03230674884973 | 1.10307547759355 | −9.70718411372772 |
| −3.24035562050785 | 17.65725013844254 | −3.50987002916867 | 19.12834006053316 |
| −4.48667227743035 | 9.65153614495669 | −4.74626967501324 | 10.77273449733951 |
| −3.37353326803794 | 18.38416756232730 | −3.65413392382905 | 19.91579370314000 |
| −4.74626967501324 | 10.77273449733951 | −2.45570310970702 | 5.78810692781644 |
| −3.65413392382905 | 19.91579370314000 | −1.92316457514888 | 34.06576640952794 |
| −2.45563801116605 | 5.78795538255257 | 0 | 0 |
| −1.92311388094100 | 34.06549009915857 | 0 | 0 |

-continued

ANNEX A

| | | | |
|---|---|---|---|
| −4.24257585542218 | 8.61214216429985 | −4.48410225363354 | 9.64051465262649 |
| −3.11194235465594 | 16.95634952280972 | −3.37076721168837 | 18.36906960532764 |
| 10.00000000000000 | 0 | 0 | 0 |
| 0 | 10.00000000000000 | 0 | 0 |
| −10.00000000000000 | 0 | 0 | 0 |
| 0 | −10.00000000000000 | 0 | 0 |
| 0 | 0 | 10.00000000000000 | 0 |
| 0 | 0 | 0 | 10.00000000000000 |
| 0 | 0 | −10.00000000000000 | 0 |
| 0 | 0 | 0 | −10.00000000000000 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 23.58319327731092 | 0 | 0 |

Columns 5 through 8

| | | | |
|---|---|---|---|
| 4.61307393084638 | −10.19554165253652 | 4.88207341973133 | −11.36516561338645 |
| −4.61307393084638 | 10.19554165253652 | −4.88207341973133 | 11.36516561338645 |
| −1.10307547759355 | 9.70718411372772 | −1.22319512632872 | 10.43671459096085 |
| 1.10307547759355 | −9.70718411372772 | 1.22319512632872 | −10.43671459096085 |
| −3.50987002916867 | 19.12834006053316 | −3.80182000031313 | 44.30513241212174 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 4.88207341973133 | −11.36516561338645 | 0 | 0 |
| −4.88207341973133 | 11.36516561338645 | 0 | 0 |
| −1.22319512632872 | 10.43671459096085 | 0 | 0 |
| 1.22319512632872 | −10.43671459096085 | 0 | 0 |
| −3.80182000031313 | 44.30513241212174 | 0 | 0 |
| −2.45570310970702 | 5.78810692781644 | 0 | 0 |
| −1.92316457514888 | 34.06576640952794 | 0 | 0 |
| 0 | 0 | 0 | 0 |
| 0 | 0 | 0 | 0 |
| 0 | 0 | 0 | 0 |
| −4.74350878794747 | 10.76073084014638 | −2.50581427710676 | 5.90473240922236 |
| −3.65113760882561 | 19.89943842124017 | −1.96218308803212 | 34.27843790875290 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 10.00000000000000 | 0 | 0 | 0 |
| 0 | 10.00000000000000 | 0 | 0 |
| −10.00000000000000 | 0 | 0 | 0 |
| 0 | −10.00000000000000 | 0 | 0 |
| 0 | 0 | 10.00000000000000 | 0 |
| 0 | 0 | 0 | 10.00000000000000 |
| 0 | 0 | −10.00000000000000 | 0 |
| 0 | 0 | 0 | −10.00000000000000 |
| 0 | 0 | 0 | 0 |

G2 =

10.00000000000000
10.00000000000000
10.00000000000000
19.00000000000000
10.00000000000000
10.00000000000000
10.00000000000000
10.00000000000000
19.00000000000000

-continued

ANNEX A 10.00000000000000
10.00000000000000
10.00000000000000
10.00000000000000
19.00000000000000
10.00000000000000
10.00000000000000
10.00000000000000
10.00000000000000
19.00000000000000
10.00000000000000
10.00000000000000
10.00000000000000
10.00000000000000
10.00000000000000
10.00000000000000
10.00000000000000
10.00000000000000
10.00000000000000
10.00000000000000
18.30000000000000
8.75000000000000
10.00000000000000
10.00000000000000
18.30000000000000
8.75000000000000
10.00000000000000
10.00000000000000
18.30000000000000
8.75000000000000
10.00000000000000
10.00000000000000
18.30000000000000
8.75000000000000
10.00000000000000

G3 =

| | |
|---|---|
| −0.00330719988500 | 0.00204484180379 |
| 0.00330719988500 | −0.00204484180379 |
| 0.00218796261634 | −0.00191431341341 |
| −0.00218796261634 | 0.00191431341341 |
| 0.02476044878265 | −0.37927682959095 |
| 2.48073850948028 | −0.18720922351683 |
| −2.48073850948028 | 0.18720922351683 |
| −0.26682035359886 | 2.39166776915925 |
| 0.26682035359886 | −2.39166776915925 |
| 7.52477567275329 | 40.88994047311752 |
| −0.61828908953375 | 0.09039778677730 |
| 0.61828908953375 | −0.09039778677730 |
| 0.12907014186815 | −0.57527346111921 |
| −0.12907014186815 | 0.57527346111921 |
| −0.77921644122098 | −9.63088699111152 |
| 0.14708120873580 | −0.03041686629321 |
| −0.14708120873580 | 0.03041686629321 |
| −0.04382316474772 | 0.13254706828496 |
| 0.04382316474772 | −0.13254706828496 |
| −0.04937963627824 | 2.25054562025480 |
| 0.23348214118743 | −0.02325468025269 |
| 0.23055562713495 | 1.68035092112619 |
| −0.92549430239430 | 0.02031979982670 |
| −1.67759012450445 | −7.28456218929926 |
| 3.74920560883745 | 0.21027562982535 |
| 10.11675771196321 | 31.27590964582517 |
| −0.06981325167668 | 0.01256759415005 |
| −0.03821413719430 | −0.27142909716651 |
| 33.59032421873964 | 37.68187097508957 |
| 3.77460260883019 | 15.72149916731087 |
| −33.59032421873964 | −37.68187097508957 |
| −3.77460260883019 | −15.72149916731087 |
| −7.32437160230402 | −8.38041038049752 |
| −0.51743400039300 | −3.68738792910564 |
| 7.32437160230402 | 8.38041038049752 |
| 0.51743400039300 | 3.68738792910564 |
| 1.57680865175681 | 1.84905827456276 |
| 0.03225323597036 | 0.86139350213013 |
| −1.57680865175681 | −1.84905827456276 |

-continued

ANNEX A

| | |
|---|---|
| −0.03225323597036 | −0.86139350213013 |
| −0.27061957423971 | −0.32591767620609 |
| 0.00850548220543 | −0.15921990195714 |
| 0.27061957423971 | 0.32591767620609 |
| −0.00850548220543 | 0.15921990195714 |
| 12.76977542976562 | 21.43362627154734 |

$L_4 =$
Columns 1 through 4

| | | | |
|---|---|---|---|
| 8.19275011669363 | −9.16128821544214 | 7.93394257284308 | −8.82546512457338 |
| −9.16128821539610 | 46.55503608093780 | −8.10701799291201 | 44.09651955758454 |
| 7.93394257283944 | −8.10701799288654 | 8.19275011669454 | −9.16128821544214 |
| −8.82546512459521 | 44.09651955756271 | −9.16128821539610 | 46.55503608093052 |
| 7.56877680297839 | −6.80224049947719 | 7.93394257283762 | −8.10701799288654 |
| −8.17557499788199 | 40.62762729417591 | −8.82546512459885 | 44.09651955756271 |
| 7.22689023117164 | −5.61109886960912 | 7.56877680297839 | −6.80224049947719 |
| −7.57508174434588 | 37.42692891618935 | −8.17557499788199 | 40.62762729417591 |

Columns 5 through 8

| | | | |
|---|---|---|---|
| 7.56877680297021 | −8.17557499786926 | 7.22689023117891 | −7.57508174434770 |
| −6.80224049947356 | 40.62762729406677 | −5.61109886961640 | 37.42692891633487 |
| 7.93394257284308 | −8.82546512457338 | 7.56877680297839 | −8.17557499786926 |
| −8.10701799291564 | 44.09651955758454 | −6.80224049947356 | 40.62762729407405 |
| 8.19275011669454 | −9.16128821544214 | 7.93394257284308 | −8.82546512457338 |
| −9.16128821539428 | 46.55503608093052 | −8.10701799291201 | 44.09651955758454 |
| 7.93394257283944 | −8.10701799288654 | 8.19275011669454 | −9.16128821544214 |
| −8.82546512459703 | 44.09651955757727 | −9.16128821539610 | 46.55503608092324 |

$L_5 =$
Columns 1 through 4

| | | | |
|---|---|---|---|
| 39.34460372612261 | −20.60415177569212 | 38.14888218358419 | 19.23329202760215 |
| 27.30912827000111 | 62.06558474436042 | 28.50739582835149 | 56.91091689084533 |

Columns 5 through 8

| | | | |
|---|---|---|---|
| 37.00927763400341 | −17.96363745911185 | 35.92217723295153 | 16.78749039699233 |
| 29.54901079863316 | 52.15998376089192 | 30.44727794647065 | 47.78160471289630 |

Annex B

The form of a general parametric semi-infinite program (Hettich and Kortanek, 1983) is:

$$\phi(P, \theta) = \left\{ \min_z f(z, \theta) \mid h(z, \theta, t) \le 0 \ \forall t \in B \right\} \quad (P)$$

where z are the optimisation variables, $\theta \in \Theta$ are the parameters and B denotes an infinite closed and bounded set.

Assume that in program, (P) (i) f and h are convex with respect to z and (ii) f, h are finite over $\Re^n$ and (iii) $\phi(P, \theta)$ is finite. Assume also that for every set of n+1 points $t_0, \ldots, t_n \in B$ a $\bar{z}$ exists such that $h(\bar{z}, \theta t_i) < 0$, $i = 0, \ldots, n$, $\forall \theta \in \Theta$. Then there exists $\lambda_n = \{t1, \ldots, t_n\}$ such that: (i) $\phi(P, \theta) = \phi(P(\lambda_n), \theta$; and (ii) there exist multipliers $\mu_i \ge 0$, $1 = 1, \ldots, n$ such that $$\phi(P, \theta) = \inf \left\{ f(z, \theta) - \sum_{i=1}^{n} \mu_i h(z, \theta, t_i) \mid z \in R^n \right\}$$

for every possible realisation of $\theta \in \Theta$.

Note that problem (1a)-(7a) falls into the general category of (P). In our case f is a convex quadratic function and h is a linear function with respect of the optimisation variables. Hence, according to (5.1) ∃ a finite set of discrete time points such that by imposing the constraints (5a) on those points the solution of the original parametric dynamic optimisation problem is equivalent to the solution of the resulting multi-parametric quadratic problem. This practically means that if the feasibility test in Step III has always a solution, the decomposition method (Steps I-IV) converges, guaranteeing optimality of problem (1a)-(5a).

The invention claimed is:

1. A method of controlling operation of a system, the system having a control input variable and a parameter that can be measured or estimated, the method comprising:
constructing, off-line, a system operation model based on said control input variable and measurable parameter;
constructing, off-line, an optimised explicit control solution comprising a value of said control input variable as a function of said parameter using parametric optimisation, in which the control solution comprises a co-ordinate space of at least one control variable value region comprising a control variable substitution value or a control variable value as a function of a parameter value, the co-ordinate being the parameter;
storing the control solution on a data storage device; and
during operation of the system, measuring or estimating a parameter of the system, obtaining the control input variable based on the measured or estimated parameter from the stored control solution, and inputting the obtained control input variable to the system to control operation of the system according to the measured or estimated parameter of the system.

2. A method as claimed in claim 1 in which the system operation model is a model predictive control (MPC) model.

3. A method as claimed in claim 2 in which the explicit control solution is constructed in the continuous time domain.

4. A method as claimed in claim 3 in which the explicit control system comprises the solution of a multiparametric dynamic optimisation problem.

5. A method as claimed in claim 3 in which the control variable is obtained as a function of said parameter and time.

6. A method as claimed in claims 2 in which the MPC is formulated as a Quadratic Program.

7. A method as claimed in claim 1 in which the parameter comprises a measurable state.

8. A method as claimed in claim 1 in which the parameter comprises a system disturbance.

9. A method as claimed in claim 1 further comprising the step of analysing the control solution and constructing a revised system model based on said analysis.

10. A method as claimed in claim 1 in which the system operation model and/or the control solution includes a disturbance compensation term.

11. A method as claimed in claim 10 in which the control solution co-ordinate space further includes a disturbance as a co-ordinate.

12. A method as claimed in claim 10 in which the system operation model includes a worst-case disturbance compensation term.

13. A method as claimed in claim 12 in which the control solution co-ordinate space excludes a disturbance as a co-ordinate.

14. A method as claimed in claim 10 in which the control solution includes a disturbance estimate.

15. A method as claimed in claim 14 which the control solution is adjusted in an on-line control operation to correct the disturbance estimate.

16. A method as claimed in claim 1 in which the control solution is adjusted in an on-line control operation to correct a disturbance estimate.

17. A method as claimed in claim 1 in which the constructing are implemented by a computer program stored in a computer readable medium.

18. A computer readable medium storing a computer program for implementing a method as claimed in claim 1.

19. A method as claimed in claim 1 in which the control solution is stored in a data storage device comprising a computer readable medium.

20. A method of controlling operation of a system comprising:
    measuring or estimating, on-line, at a first time interval a parameter of the system;
    obtaining a control input variable based on the parameter from a pre-defined parametric optimised explicit control solution, the pre-defined parametric optimized explicit solution comprising a value of a control input variable of the system as a function of said parameter, in which the control solution comprises a co-ordinate space of at least one control variable value region comprising a control variable substitution value or a control variable as a function of a parameter value, the co-ordinate being the parameter value; and
    inputting the obtained control input variable to the system to control operation of the system according to the parameter of the system.

21. A method as claimed in claim 20 in which the measuring or estimating the on-line parameter and deriving the control variable are repeated at subsequent time intervals.

22. A method as claimed in claim 20 in which the control variable is further obtained based on a disturbance compensation term.

23. A method as claimed in claim 22 in which the control solution co-ordinate space further includes a disturbance as a co-ordinate.

24. A method as claimed in claim 22 in which the control solution includes a disturbance estimate.

25. A method of controlling operation of a system, the system having a control input variable and a parameter that can be measured or estimated, the method comprising:
    constructing, off-line, a system operation model based on said control input variable and measurable parameter;
    constructing, off-line, an optimised explicit control solution comprising a value of said control input variable as a function of said parameter using parametric optimisation;
    identifying a parameter of which the explicit solution is independent and eliminating measurements of said parameter; and
    storing the control solution in a hardware data storage device and in which the control solution comprises a coordinate space of at least one control input variable value region comprising a control input variable substitution value or a control input variable value as a function of the parameter, the co-ordinate being the parameter value, the method further comprising unifying control input variable value having the same solution, the stored control solution being employed to provide the system with the control input variable based on the parameter of the system to control operation of the system according to the parameter of the system.

* * * * *

UNITED STATES PATENT AND TRADEMARK OFFICE
CERTIFICATE OF CORRECTION

PATENT NO. : 7,433,743 B2
APPLICATION NO. : 10/479100
DATED : October 7, 2008
INVENTOR(S) : Efstratios Pistikopoulos et al.

Page 1 of 1

It is certified that error appears in the above-identified patent and that said Letters Patent is hereby corrected as shown below:

<u>On the Title Page</u>

In Section (75) Inventors:

"John D. Perking" should read, --John D. Perkins--

Signed and Sealed this

Twenty-seventh Day of October, 2009

David J. Kappos
*Director of the United States Patent and Trademark Office*